United States Patent [19]
Kobayashi et al.

[11] Patent Number: 5,234,091
[45] Date of Patent: Aug. 10, 1993

[54] POWER TRANSMISSION SYSTEM FOR A FOUR-WHEEL DRIVE MOTOR VEHICLE

[75] Inventors: Toshio Kobayashi, Tokyo; Keiichi Maruyama, Yokohama; Yukio Ohnuki, Hachioji, all of Japan

[73] Assignee: Fuji Jukogyo Kabushiki Kaisha, Tokyo, Japan

[21] Appl. No.: 906,159

[22] Filed: Jun. 29, 1992

Related U.S. Application Data

[60] Division of Ser. No. 652,474, Feb. 8, 1991, Pat. No. 5,148,903, which is a continuation of Ser. No. 381,124, Jul. 14, 1989, abandoned.

[30] Foreign Application Priority Data

| Jul. 28, 1988 | [JP] | Japan | 63-189792 |
|---|---|---|---|
| Jul. 28, 1988 | [JP] | Japan | 63-189793 |
| Jul. 28, 1988 | [JP] | Japan | 63-189794 |
| Jul. 28, 1988 | [JP] | Japan | 63-189795 |
| Jul. 28, 1988 | [JP] | Japan | 63-189796 |
| Jul. 28, 1988 | [JP] | Japan | 63-189797 |
| Jul. 30, 1988 | [JP] | Japan | 63-191146 |
| Jul. 30, 1988 | [JP] | Japan | 63-191147 |
| Sep. 28, 1988 | [JP] | Japan | 63-242974 |
| Sep. 28, 1988 | [JP] | Japan | 63-242975 |

[51] Int. Cl.$^5$ ............... F16D 25/08; B60K 17/348
[52] U.S. Cl. ....................... 192/85 CA; 475/86; 475/206
[58] Field of Search .......... 192/58 C, 85 AA, 85 CA, 192/106 F; 180/233, 248; 475/200, 86, 206

[56] References Cited

U.S. PATENT DOCUMENTS

| 3,038,575 | 6/1962 | Hansen | 192/85 CA |
|---|---|---|---|
| 3,913,414 | 10/1975 | Feiburger | 475/86 |
| 4,226,319 | 10/1980 | Euler et al. | 192/85 CA |
| 4,811,628 | 3/1989 | Winkam et al. | 192/85 CA X |

FOREIGN PATENT DOCUMENTS

| 61-146637 | 7/1985 | Japan |  |
|---|---|---|---|
| 61-28531 | 7/1986 | Japan |  |
| 61-155027 | 7/1986 | Japan |  |
| 2189861 | 11/1987 | United Kingdom | 180/233 |

Primary Examiner—Rodney H. Bonck
Attorney, Agent, or Firm—Martin A. Farber

[57] ABSTRACT

A casing is provided in a power train of a four-wheel drive motor vehicle and supported on a body of the vehicle. A fluid operated multiple-disk friction clutch is disposed in the casing. The clutch has a drive drum operatively connected to an input member of the power train and a driven drum operatively connected to an output member of the power train, and a piston slidably mounted in a piston chamber and operated by oil supplied to the piston chamber for engaging the drive drum with the driven drum. A hydraulic circuit having an oil pump is provided for exclusively supplying oil to the piston chamber.

2 Claims, 25 Drawing Sheets

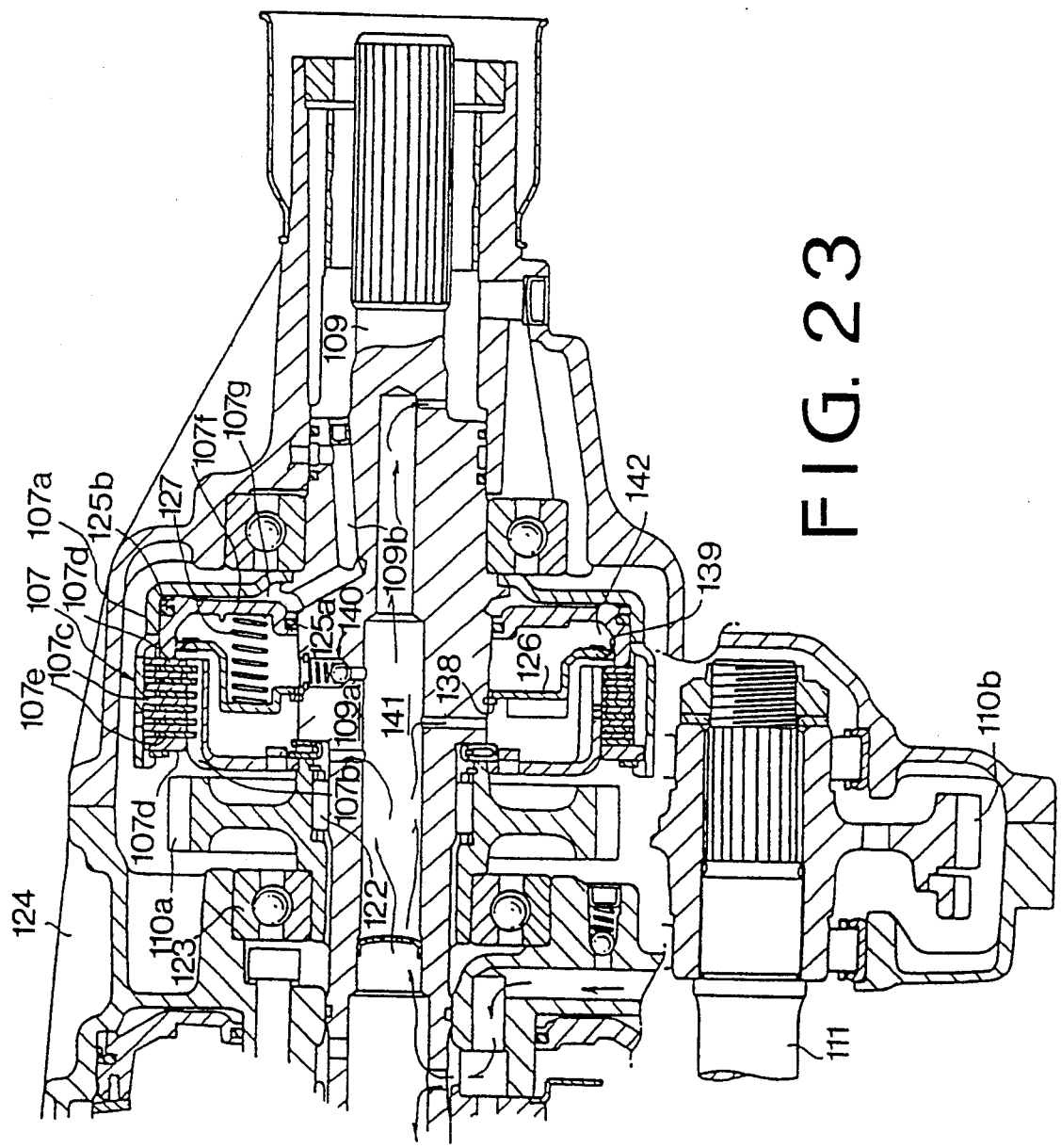

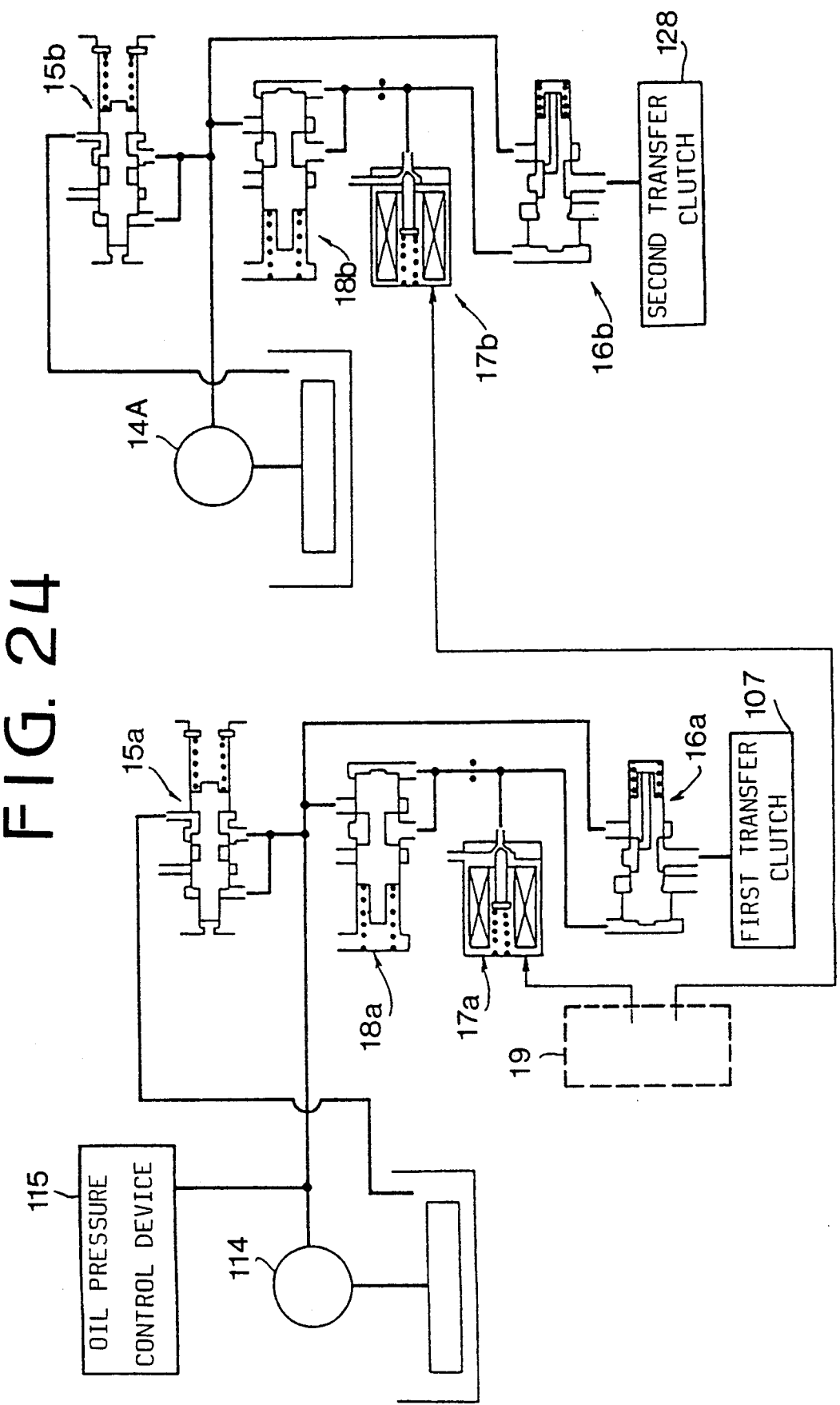

POWER TRANSMISSION SYSTEM FOR A FOUR-WHEEL DRIVE MOTOR VEHICLE

This application is a division of application Ser. No. 07/652,474, filed Feb. 8, 1991 and now U.S. Pat. No. 5,148,903, which is a continuation of application Ser. No. 07/381,124, filed Jul. 14, 1989, and now abandoned.

BACKGROUND OF THE INVENTION

The present invention relates to a power transmission system for a four-wheel drive motor vehicle, and more particularly to a system having a fluid-operated multiple-disk friction clutch for distributing the power of an engine to front and rear wheels of the vehicle.

Japanese Patent Publication 61-28531 discloses a system in which a fluid-operated multiple-disk friction clutch is provided as a transfer device for distributing the power of the engine to the front wheels and rear wheels. The clutch is disposed in an extension case of an automatic transmission.

The clutch comprises a clutch drum and a clutch hub, each having a plurality of disks, and a piston oil chamber formed between the clutch drum and a piston. The piston is slidably mounted on the hub with splines for pushing the disks of the clutch drum to the disks of the hub. When the clutch hub rotates, the piston rotates together with the hub.

When the clutch rotates at a high speed, the centrifugal force of oil in the piston oil chamber is exerted on the piston. When disengaging the clutch, the pressure of the oil is reduced. However, the centrifugal force acts to push the piston to the disks of the clutch drum, so that the clutch cannot be completely disengaged. Further, the centrifugal force causes various disadvantages in accurate control of the pressure of oil.

In order to provide a sufficient transmitting torque for the clutch, the diameter of the piston must be enlarged. However, since the piston is mounted on the clutch drum, an increase of the diameter of the piston entails an increase of the diameter of the clutch drum. If the clutch drum becomes large, the resistance of lubricating oil in the clutch during operation becomes large, which causes a reduction of power transmission efficiency.

The prior art has a further disadvantage as described below.

The multiple-disk friction clutch uses the oil in the automatic transmission as actuating oil for actuating and lubricating the clutch, since the oil has a good friction characteristic and a low oil viscosity. On the other hand, a differential provided between the right and left driving wheels comprises hypoid gears. In such a differential, there is an extreme-pressure lubricant which contains additives to improve the ability to adhere to the surfaces of metals under high bearing pressures Such a lubricant is liable to cause the multiple disks of the clutch to stick and to slip, which causes an unpleasant vibration of the vehicle body. Further, the friction characteristic of the lubricant largely changes with temperature, adversely affects durability and reliability of the clutch.

Japanese Patent Application Laid-Open 61-155027 discloses a system in which a pair of transfer clutches for the front wheels and for the rear wheels are provided in a transfer device provided for distributing the torque to the front wheels and the rear wheels.

Japanese Patet Application Laid-Open 61-146637 also discloses a system in which a transfer clutch is provided between a final reduction gear of a differential and a transfer device. A piston of the transfer clutch is mounted in the final reduction gear. Accordingly, in such systems, the centrifugal force is similarly exerted on the piston when the power transmission system rotates.

SUMMARY OF THE INVENTION

An object of the present invention is to provide a power transmission system in which no centrifugal force is produce in a transfer clutch.

Another object of the present invention is to provide a system in which an exclusive oil supply system is provided for the transfer clutch.

BRIEF DESCRIPTION OF DRAWINGS

FIG. 23 is a sectional view showing a part of the seventh embodiment; and

FIG. 24 shows a hydraulic circuit of the system.

DETAILED DESCRIPTION OF THE PREFERRED EMBODIMENTS

Figure 1:
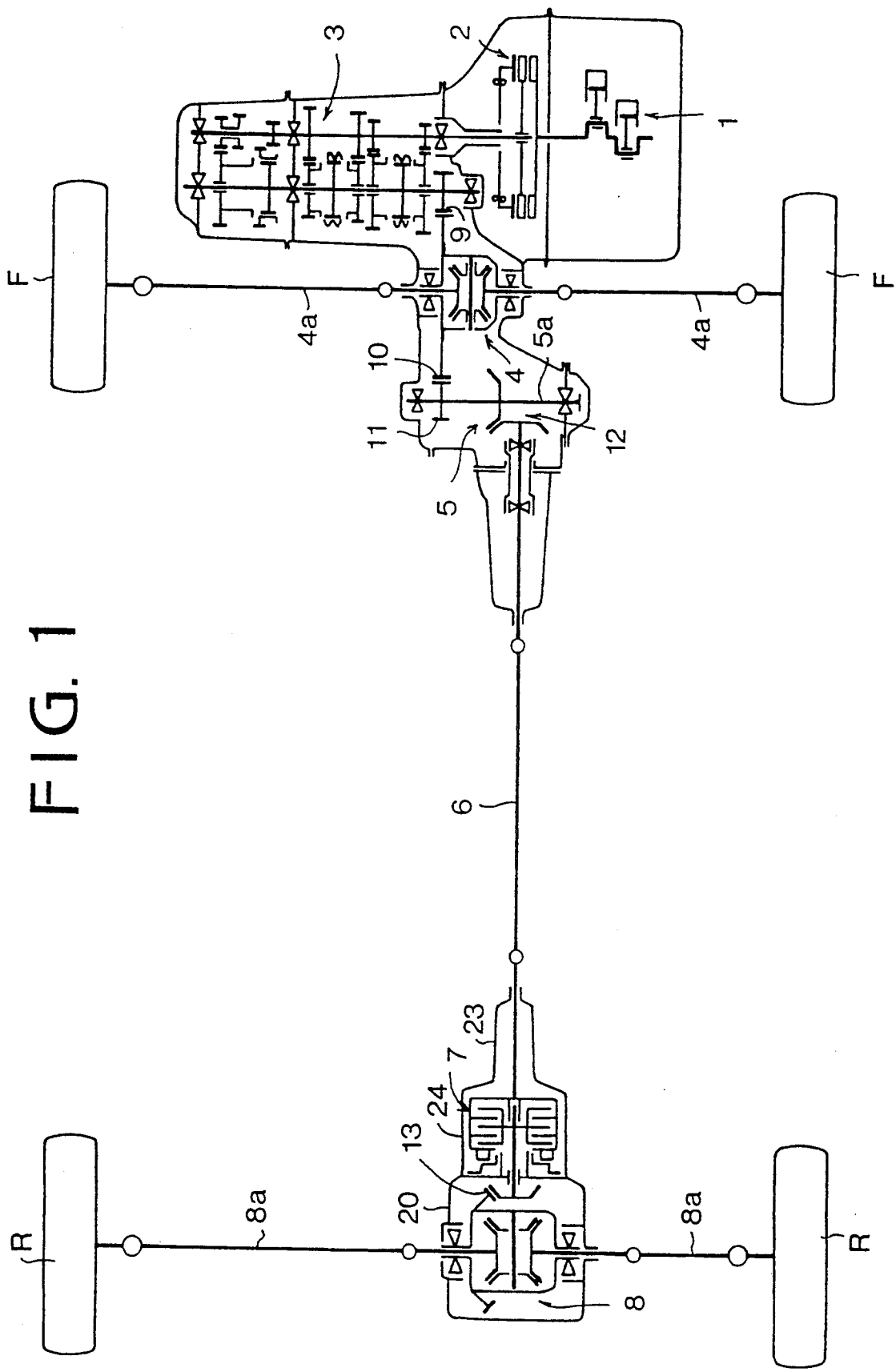
FIG. 1 is a schematic diagram showing a four-wheel drive power transmission system according to the present invention.

FIG. 1 shows a power transmission system of a four-wheel drive motor vehicle having a trans-axle power transmission system to which the present invention is applied. In a front portion of the motor vehicle, an engine 1, a clutch 2 and a manual transmission 3 are laterally mounted and connected to each other. The power transmission system has a front power train and a rear power train. The front power train has a front differential 4. The rear power train comprises a transfer device 5, a propeller shaft 6, a transfer clutch in the form of a fluid operated multiple-disk friction clutch and a rear differential 8 connected to each other.

The power of the engine 1 is transmitted to the transmission 3 through the clutch 2. The output torque of the transmission is transmitted to front wheels F of the vehicle through an output gear 9, a final reduction gear 10, the front differential 4, and axles 4a. The final reduction gear 10 engages with an input gear 11 of the transfer device 5, which is securely mounted on a transfer shaft 5a. The transfer shaft 5a is operatively connected to the propeller shaft 6 through a pair of bevel gears 12, thereby transmitting the power to the transfer clutch 7. The power is transmitted to rear wheels R of the vehicle through a final reduction gear 13, the rear differential 8 and axles 8a at a predetermined distribution ratio determined by the clutch 7.

Figure 2:
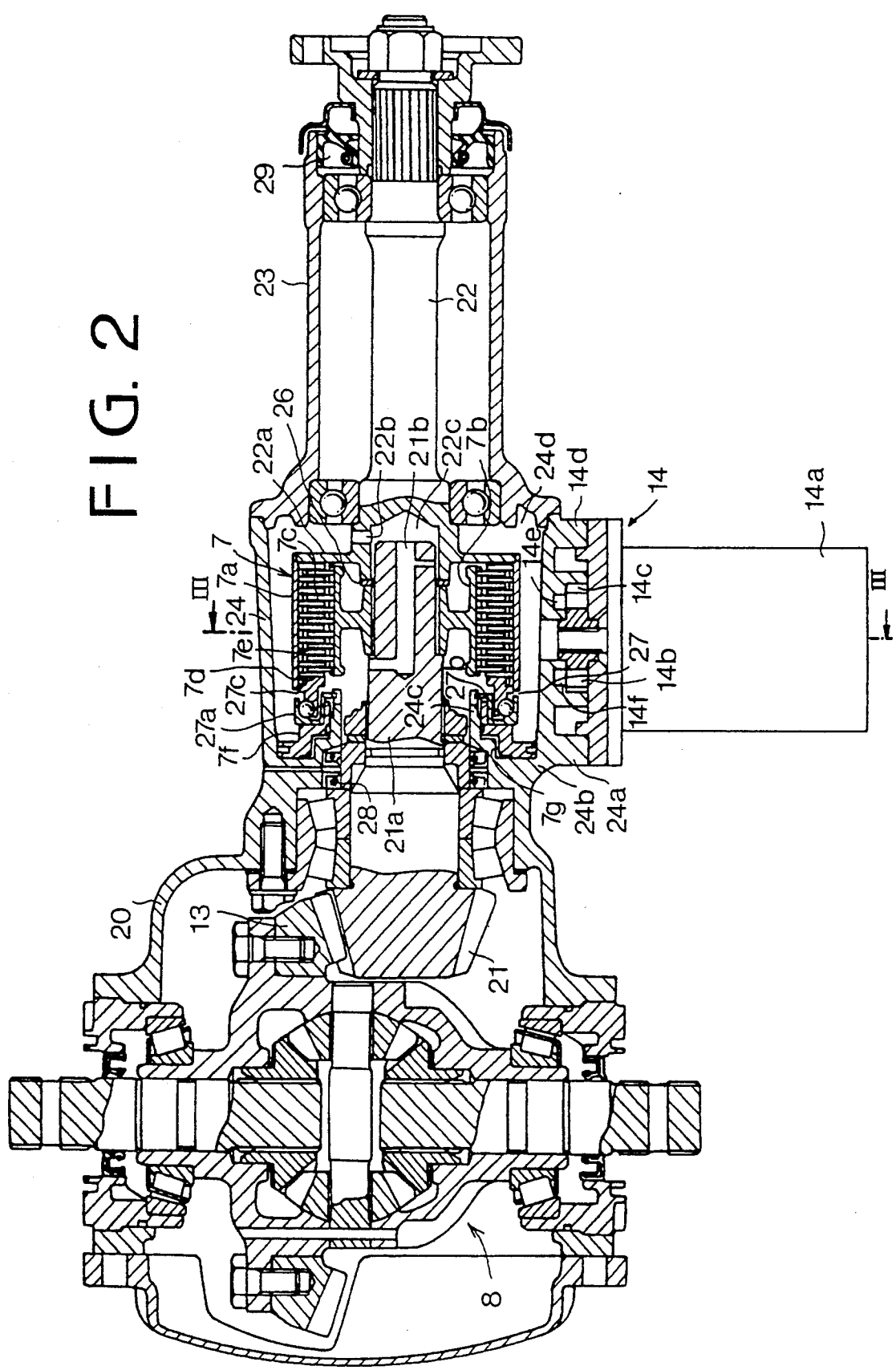
FIG. 2 is a sectional view showing a part of the system.

Referring to FIG. 2 showing the transfer clutch 7, a carrier 20 of the rear differential 8 which is suspended from a body of the vehicle has a cylindrical portion 24 as a casing for the clutch 7. The cylindrical portion 24 is integrally formed with the carrier 20 to form an oil chamber 24d therein. An extension case 23 is secured to a front end of the cylindrical portion 24. An input shaft 22 is rotatably mounted in the extension case 23 and connected to the propeller shaft 6. A drive pinion shaft 21a having a drive pinion 21 is rotatably mounted in the carrier 20 of the rear differential 8. An end of the drive pinion shaft 21a is rotatably mounted in a hollow end 22c of the input shaft 22. The drive pinion 21 engages with the final reduction gear 13. The transfer clutch 7 is mounted on the drive pinion shaft 21a in the cylindrical portion 24 and an oil pump 14 is secured to a side of the cylindrical portion 24 for supplying oil to the transfer clutch 7.

The transfer clutch 7 comprises a drive drum 7a secured to a flange 22a of the input shaft 22 and a driven drum 7b splined on the drive pinion shaft 21a. A front end of the driven drum 7b engages with a thrust washer 26 which abuts on the end of the input shaft 22. A plurality of drive disks 7c are splined on the drum 7a together with a pair of retainers 7d provided adjacent both end disks 7c, and a plurality of driven disks 7e are splined on the drum 7b, disposed alternately with the disks 7c. A piston 7f is slidably mounted on an inner wall of the cylindrical portion 24 and on a guide cylinder 24c thereof with splines. The piston 7f engages with the outermost retainer 7d through an angular contact bearing 27. A piston chamber 7g is defined by the piston 7f, a partition 24b and the guide cylinder 24c of the cylindrical portion 24. The bearing 27 has an outer race 27a engaged with an operating end of the piston 7f, and splined with the guide cylinder 24c at a projecting end 27b, and an inner race 27c engaged with the retainer 7d and splined on the drum 7a at the outer periphery thereof. Thus, the outer race 27a is engaged with the guide cylinder 24c for preventing rotation of outer race 27a and inner race 27c is engaged with the drum 7a rotating in the same direction.

Oil seals 28 and 29 are provided at the inner peripheries of the partition 24b and the extension case 23, respectively.

Since characteristics of the oil for the transfer clutch 7 and for hypoid gears of the differential 8 are different from each other, the oil seal 28 is provided for preventing both the oils from mixing.

Oil passages 22b and 21b are formed in the hollow end 22c of the input shaft 22 and in the drive pinion shaft 21a, respectively, so as to communicate an outer space of the drive drum 7a with an inner space of the driven drum 7b.

When the clutch drum 7a rotates, the oil in the oil chamber 24d in the cylindrical portion 24 is drawn up by the outer, wall of the drive drum 7a, and supplied to the opening of the passage 22b through an oil guide (not shown). The oil passes through the passages 22b and 21b and enters the chamber in the driven drum 7b. Further, the oil is supplied to the disks 7c and 7e through passages (not shown) radially formed in the spline portion of the driven drum 7b.

Figure 3:
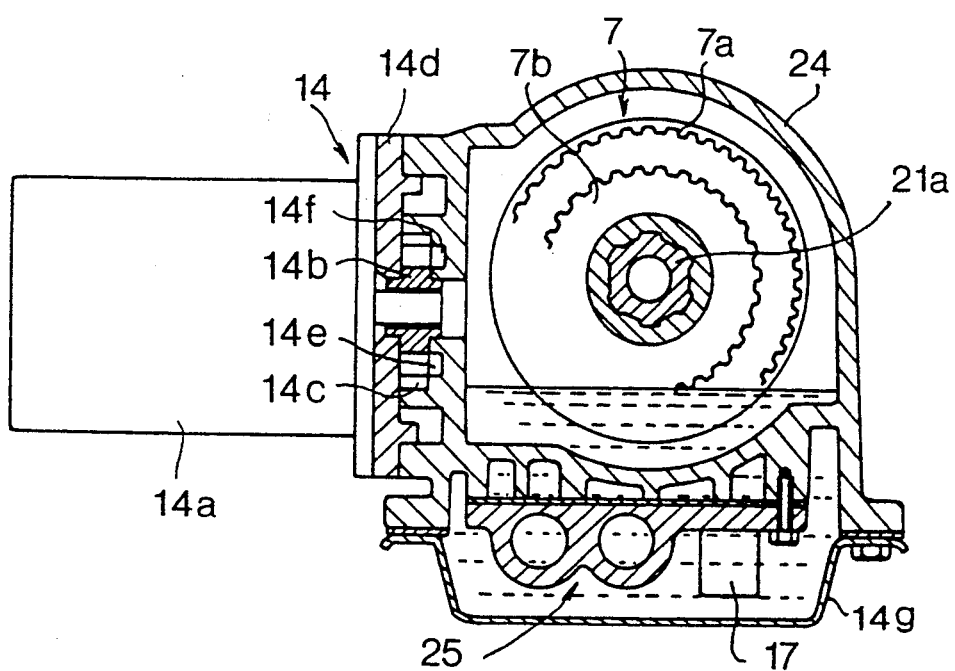
FIG. 3 is a sectional view taken along a line III—III of FIG. 2.

The oil pump 14 is secured to a housing portion 24a formed on the side of the cylindrical portion 24. As shown in FIG. 3, an oil reservoir 14g is provided on the underside of the cylindrical portion 24. A valve unit 25, which will be described hereinafter, is provided in the reservoir 14g. The oil pump 14 has an electric motor 14a, an inner rotor 14b mounted on an output shaft of the motor 14a and an outer rotor 14c engaged with the inner rotor 14b. These rotors are mounted in the housing portion 24a and covered by a cover 14d which is secured to the housing portion 24a by bolts together with the motor 14a. An inlet port 14e is communicated with an oil strainer of the oil reservoir 14g and a discharge port 14f is communicated with the valve unit 25.

Figure 5:
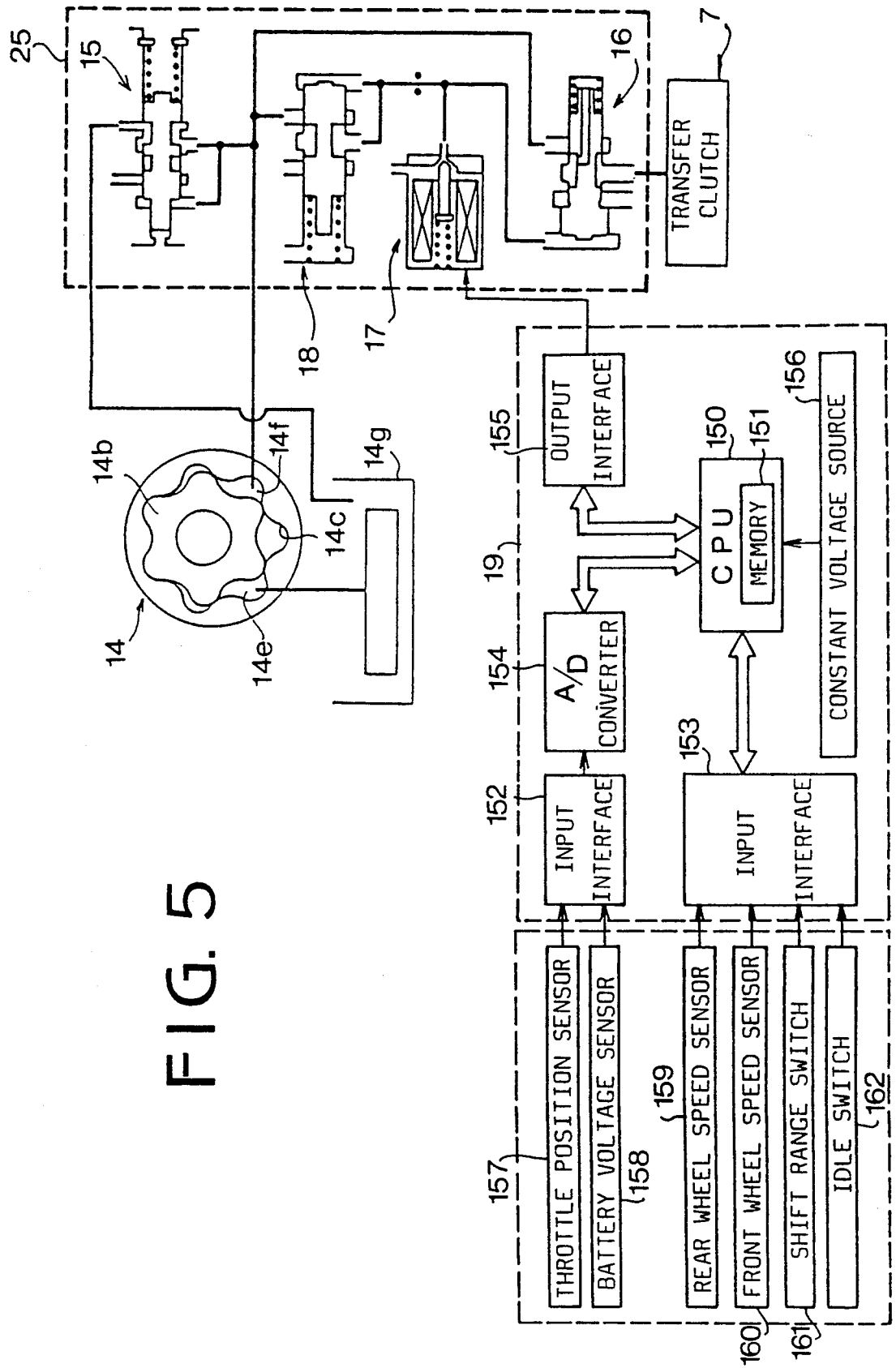
FIG. 5 shows a hydraulic control circuit for controlling a transfer clutch of the system.

A hydraulic control system for the transfer clutch 7 is described hereinafter with reference to FIG. 5. The hydraulic control system comprises the valve unit 25 and a control unit 19. The valve unit 25 has a pressure regulator valve 15, a transfer control valve 16, a solenoid operated control valve 17 and a pilot valve 18.

Oil from the oil pump 14 is supplied to the pressure regulator valve 15 by which the pressure of the oil is regulated to a predetermined value. The oil is fed to the piston chamber 7g of the transfer clutch 7 through the transfer control valve 16. The pilot valve 18 operates to provide a constant pilot pressure. The solenoid operated control valve 17 is operated by pulses from the control unit 19 at a duty ratio dependent on driving conditions of the vehicle, so that draining of the oil from the control valve 17 provides a control pressure for the transfer control valve 16. The control pressure is applied to an end of the transfer control valve 16 to control the oil supplied to the clutch 7 so as to control clutch pressure.

The control unit 19 has a CPU 150 having a memory 151, input interfaces 152, 153 and an A/D converter 154, an output interface 155 and a constant voltage source 156. Output signals from a throttle position sensor 157, a battery voltage sensor 158, a rear wheel speed sensor 159, a front wheel speed sensor 160, a shift range switch 161 and an idle switch 162 are applied to the CPU 150 through the interfaces 152, 153 and the A/D converter 154 for determining the driving conditions of the motor vehicle. An optimum duty ratio is derived from a map stored in the memory 151 in accordance with the vehicle speed and the throttle opening degree detected by the front and rear wheel speed sensors 160, 159 and the throttle position sensor 157, and applied to the solenoid operated control valve 17 through the output interface 155 to provide the control pressure for the transfer control valve 16.

Figure 4:
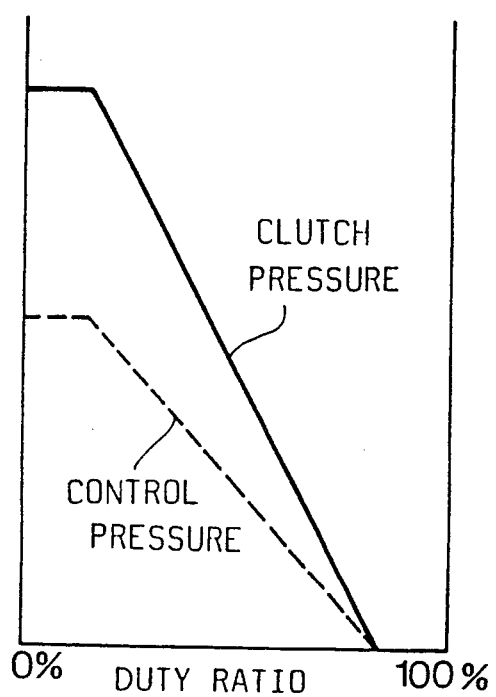
FIG. 4 is a graph showing characteristics of duty ratio for control pressure and clutch pressure.

FIG. 4 shows a relationship between the control pressure, the clutch pressure and the duty ratio.

Describing the operation of the system, the power of the engine 1 is transmitted to the transmission 3 through the clutch 2. The torque is directly transmitted to the front differential 4 and the torque is further transmitted to the rear differential 8 through the transfer clutch 7 for providing four-wheel drive. The disks 7c and 7e of the transfer clutch 7 are soaked in the optimum actuating oil so that a desired friction characteristic is ensured. The controlled pressure is applied to the chamber 7g so that the piston 7f pushes the discs 7c and 7e. Accordingly, the power is distributed to the front wheels and to the rear wheels in accordance with the transmission torque of the transfer clutch 7. The torque distributing ratio is changed in accordance with the clutch pressure controlled by the duty ratio signal from the control unit 19.

When the drive drum 7a rotates, the disks 7c and the inner race 27c of the bearing 27 are rotated. However, since the outer race 27a of the bearing 27 and the piston 7f are splined to the guide cylinder 24c of the cylindrical portion 24 through the projecting end 27b, the outer race 27a and the piston 7f do not rotate. Further, the piston chamber 7g is formed by the piston 7f and the cylindrical portion 24 and hence it does not rotate. Accordingly, centrifugal force of the oil in the chamber 7g. Thus, the pressure of the oil in the chamber 7g is accurately controlled, and unnecessary pressure is not exerted on the disks of the clutch 7, so that the torque distribution ratio can be properly controlled.

Figure 6:
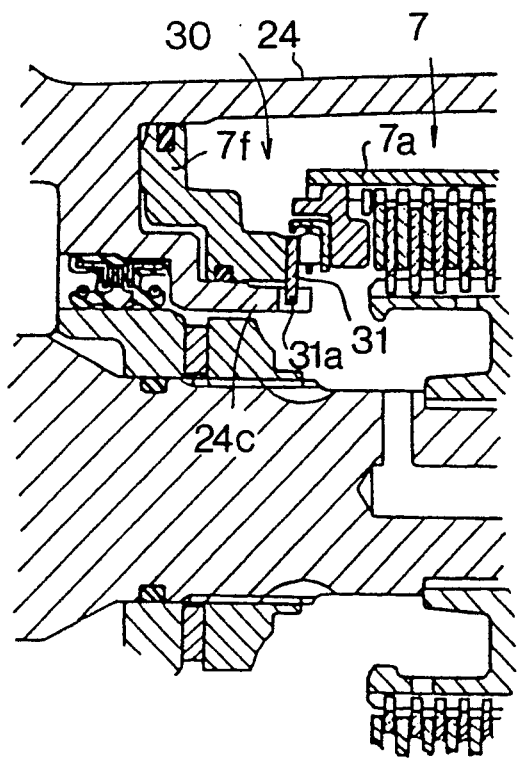
FIG. 6a is a sectional view partly showing a modification of the transfer clutch.
FIG. 6b is a perspective view showing a race of the transfer clutch.
Figure 6:
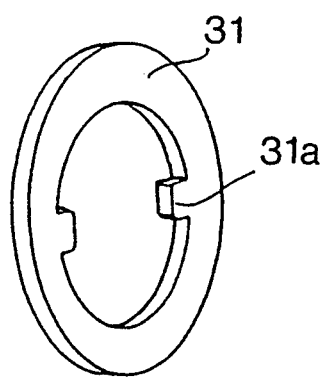

FIGS. 6a and 6b show a modification of the transfer clutch 7. In place of the bearing 27 for the piston of the transfer clutch 7, a thrust bearing 30 is employed. A race 31 of the thrust bearing 30 is engaged with grooves of the guide cylinder 24c at an inner projection 31a. Accordingly, the same effect as described hereinbefore in the previous embodiment is achieved.

In accordance with the present invention, the torque distributing ratio is changed to a front-wheel drive mode in which the torque of 100% is transmitted to the front wheels, and to a four-wheel drive mode in which the distribution of torque to the rear wheels is increased. It is possible to control the torque distributing ratio dependent on the driving conditions of the motor vehicle and surface conditions of the road, thereby improving driving stability and driveability.

Since the transfer clutch 7 is provided with the oil having a desired characteristic, sticking/slipping of disks does not occur. Thus, uncomfortable oscillation and noise are prevented, and the reliability and durability of the power transmitting system are improved.

Since the piston of the clutch is disposed outside the clutch, the diameter of the piston can be increased and the diameter of the clutch can be reduced. Accordingly, resistance of the oil in the clutch is reduced to increase the power transmission efficiency of the clutch.

The oil pump and the valve unit for the transfer clutch are disposed adjacent the transfer clutch. Thus, external pipes for the hydraulic system of the clutch are unnecessary and the system is compact in size. Further, leakage of the, oil is prevented and the response of the clutch is quick.

FIG. 7 to 10 shows a second embodiment of the present invention.

Figure 7:
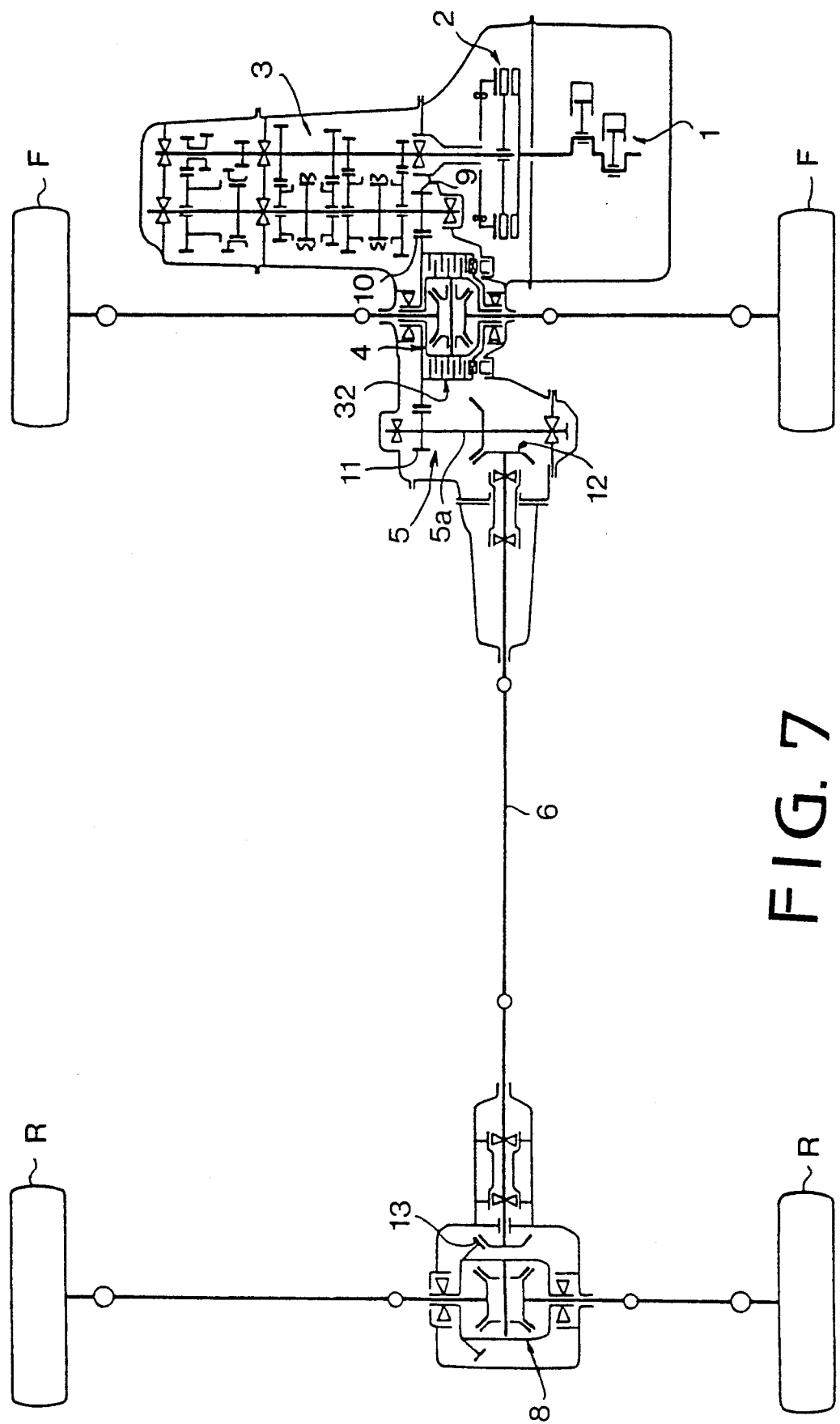
FIG. 7 is a schematic diagram showing a second embodiment of the present invention.
Figure 8:
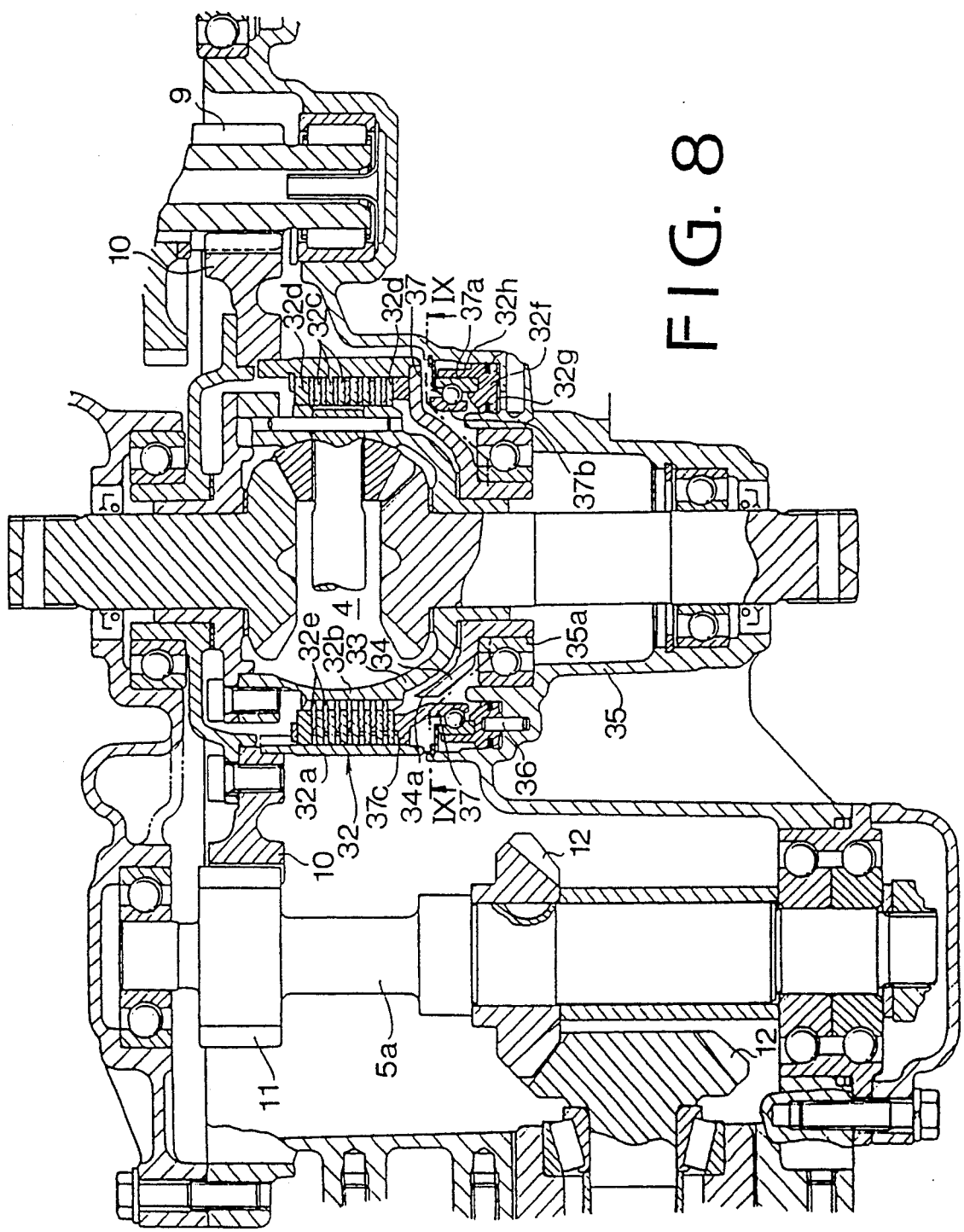
FIG. 8 is a sectional view of a transfer clutch of the second embodiment.
Figure 9:
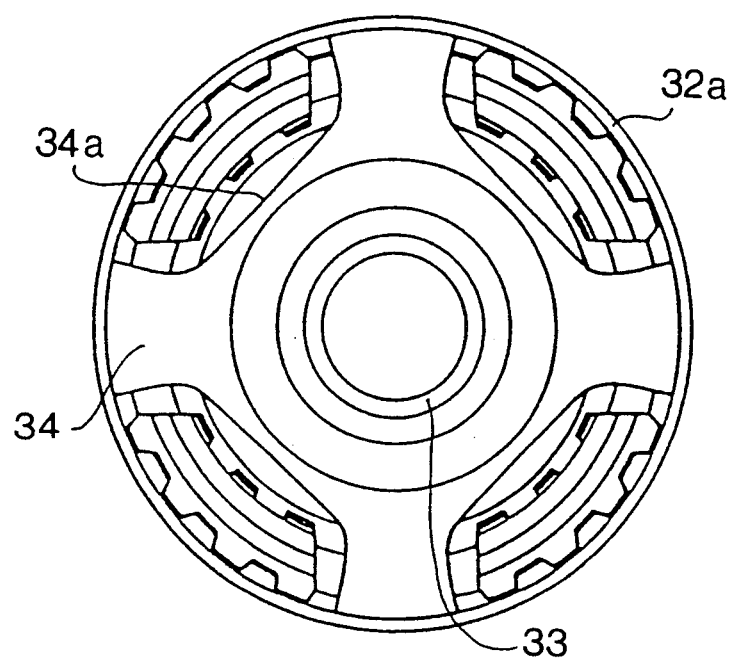
FIG. 9 is a sectional view taken along a line IX—IX of FIG. 8.

Referring to FIGS. 7 and 8, a transfer clutch 32 in the form of a multiple-disk friction clutch is disposed between the final reduction gear 10 and the front differential 4 of the power transmission system. The transfer clutch 32 is mounted on an outside wall of a differential case 33 of the front differential 4. The differential case 33 is used as a driven drum 32b of the clutch 32. A drive drum 32a is secured to a hub of the gear 10 at an end thereof. Secured to the other end of the drive drum 32a is a supporting plate 34 which is rotatably mounted on a hub of the differential case 33 and rotatably supported in a casing 35 through a bearing 35a. The casing 35 is secured to a case of the transmission 3. As shown in FIG. 9, the supporting plate 34 has four windows 34a and is secured to the drive drum 32a at a part of the outer periphery thereof. A plurality of disks 32c are splined on an inner periphery of the drive drum 32a together with a pair of retainers 32d provided adjacent both end disks 32c and a plurality of disks 32e are splined on an outer periphery of the driven drum 32b, disposed alternately with the disks 32c. A ring piston 32f is slidably engaged with an inner periphery of the casing 35. The ring piston 32f is slidably engaged with a knock pin 36 mounted in the casing 35 so as to prevent the piston from rotating. A non-rotatable piston chamber 32g is formed between the piston 32f and the casing 35.

A bearing 37 is disposed between the piston 32f and the retainer 32d. The bearing 37 has an outer race 37a engaged with a boss 32h of the piston 32f and an inner race 37b. The inner race 37b has four projections 37c each of which passes through the window 34a of the supporting plate 34 and is splined with the drive drum 32a and engaged with the retainer 32d.

Figure 10:
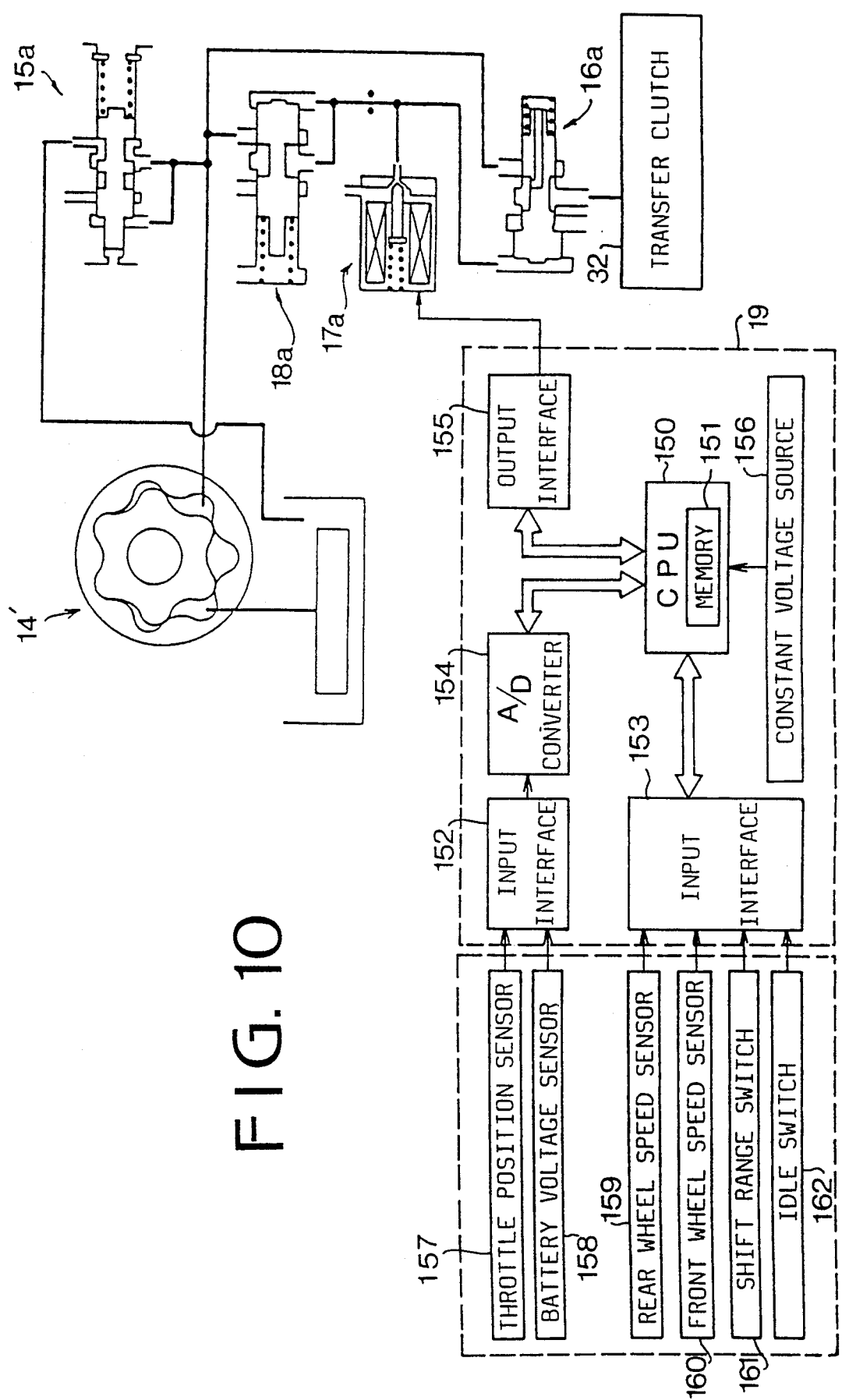
FIG. 10 shows a hydraulic control circuit for the second embodiment.

The transfer clutch 32 is supplied with oil from an oil pump 14' having substantially the same structure as the oil pump 14 through a hydraulic circuit as shown in FIG. 10. The hydraulic circuit has valves 15a, 16a, 17a and 18a which have the same structure as the valves 15, 16, 17 and 18, respectively, of the hydraulic circuit of the previous embodiment. The hydraulic circuit is controlled by the control unit 19 in the same manner as the previous embodiment.

Figure 11:
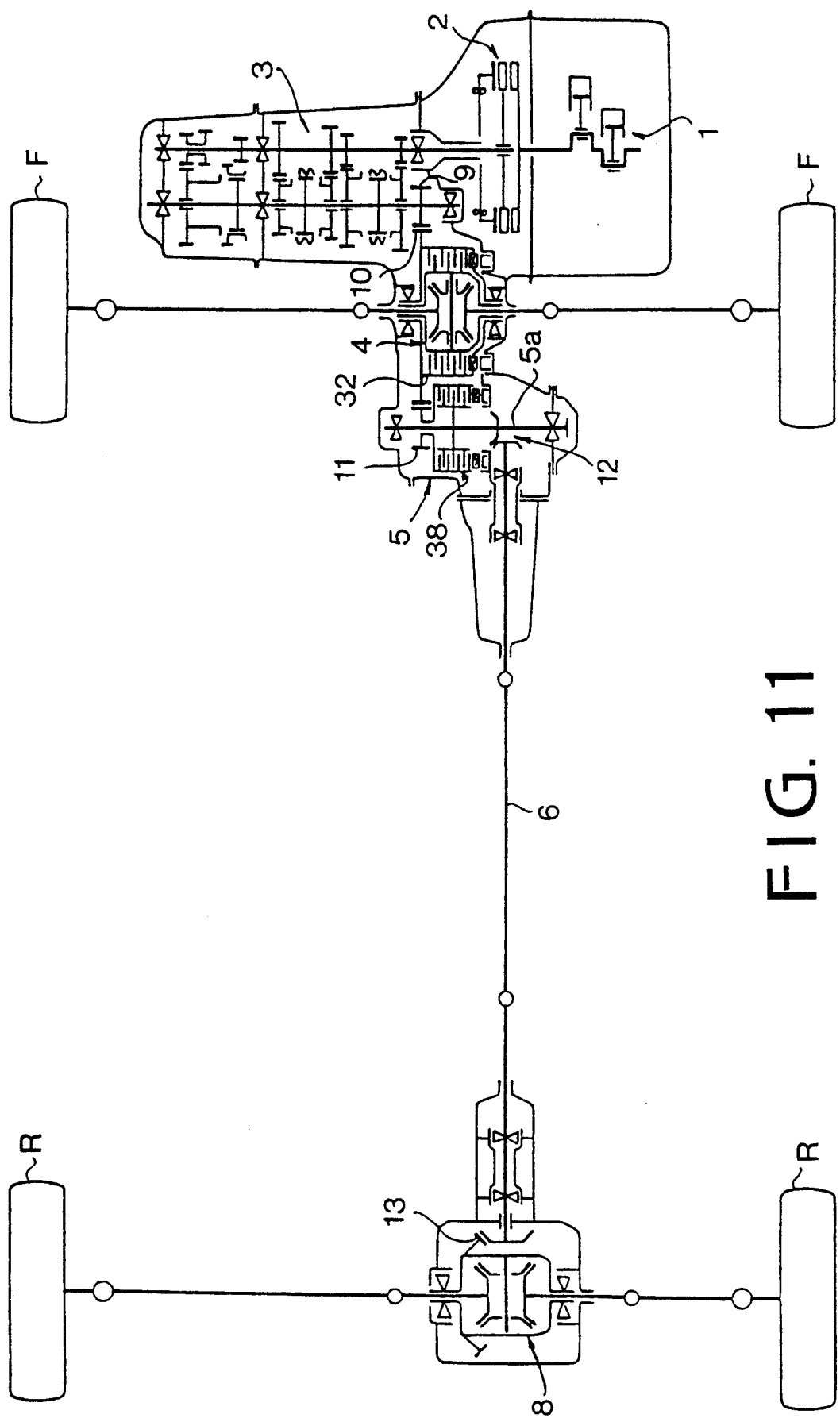
FIG. 11 is a schematic diagram showing a third embodiment.
Figure 12:
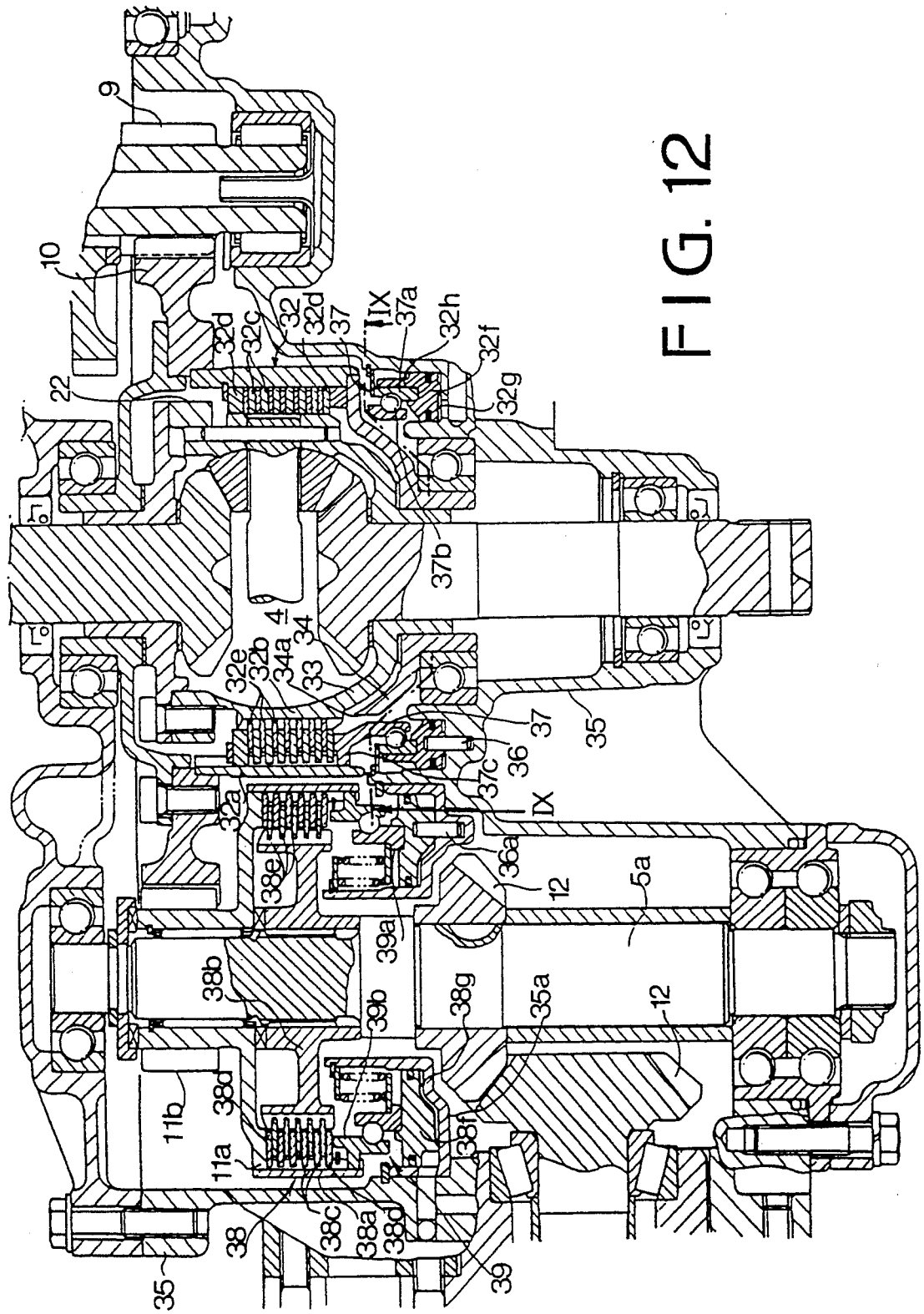
FIG. 12 is a sectional view of transfer clutches of the third embodiment.
Figure 13:
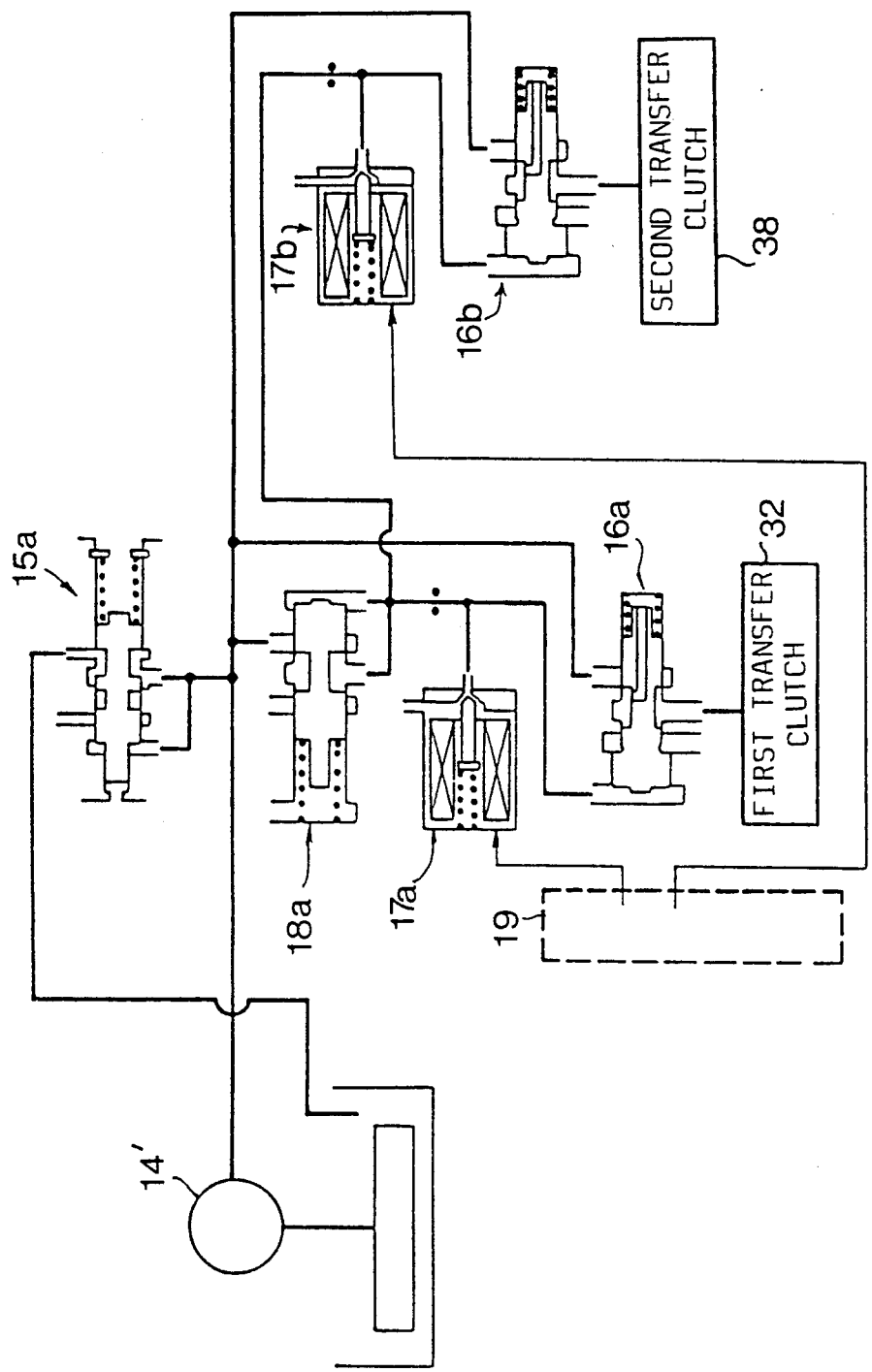
FIG. 13 is a hydraulic control circuit of the third embodiment.

FIGS. 11 to 13 show a third embodiment of the present invention.

Referring to FIGS. 11 and 12, in the third embodiment, the transfer clutch 32 is provided as a first transfer clutch and another transfer clutch 38 in the form of a multiple-disk friction clutch is provided on the transfer shaft 5a of the transfer device 5 as a second transfer clutch. The transfer clutch 32 is the same as the transfer clutch in the second embodiment.

The second transfer clutch 38 comprises a drive drum 38a secured to a flange 11a of an input gear 11b and a driven drum 38b splined to the transfer shaft 5a. A plurality of disks 38c are splined on the drum 38a together with a pair of retainers 38d provided adjacent both end disks 38c and a plurality of disks 38e are splined on the drum 38b, disposed alternately with the disks 38c. A ring piston 38f is slidably engaged with an inner periphery of an annular casing 35a secured to the casing 35. The ring piston 38f is engaged with a knock pin 36a mounted in the annular casing 35a so as to prevent the piston from rotating. A piston chamber 38g is formed between the piston 38f and the casing 35a.

A bearing 39 is disposed between the piston 38f and the retainer 38d. The bearing 39 has an inner race 39a engaged with the piston 38f, and an outer race 39b splined on the drive drum 38a and engaged with the retainer 38d.

Referring to FIG. 13 showing a hydraulic system of the third embodiment, in order to control the second transfer clutch 38, a second solenoid operated control valve 17b applied with a signal from the control unit 19 and a second transfer control valve 16b communicated with the piston chamber 38g are connected to the hydraulic circuit for the first transfer clutch 32. The second valves 16b and 17b are communicated with the oil pump 14', the pressure regulator valve 15a, and the pilot valve 18a.

Figure 14:
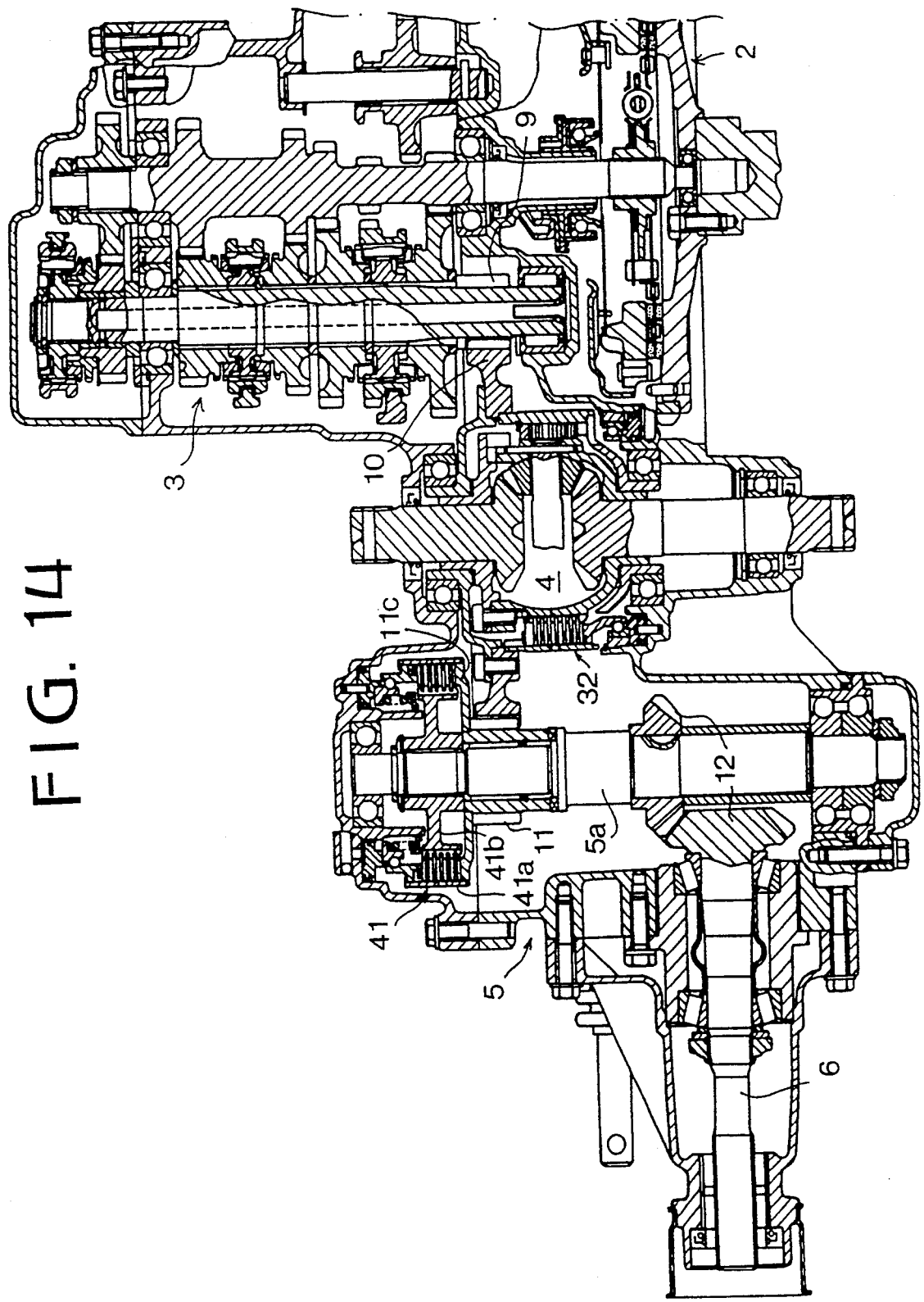
FIGS. 14 and 15 show modifications of the third embodiment, respectively.

FIG. 14 shows a modification of the third embodiment. In place of the second transfer clutch 38, another second transfer clutch 41 having the same structure as the transfer clutch 38 is provided on an end portion of the transfer shaft 5a. The transmitting power from the final reduction gear 10 is transmitted to the transfer device 5 through the input gear 11, a drive drum 41a secured to a flange 11c of the input gear 11, and a driven drum 41b splined on the transfer shaft 5a.

Figure 15:
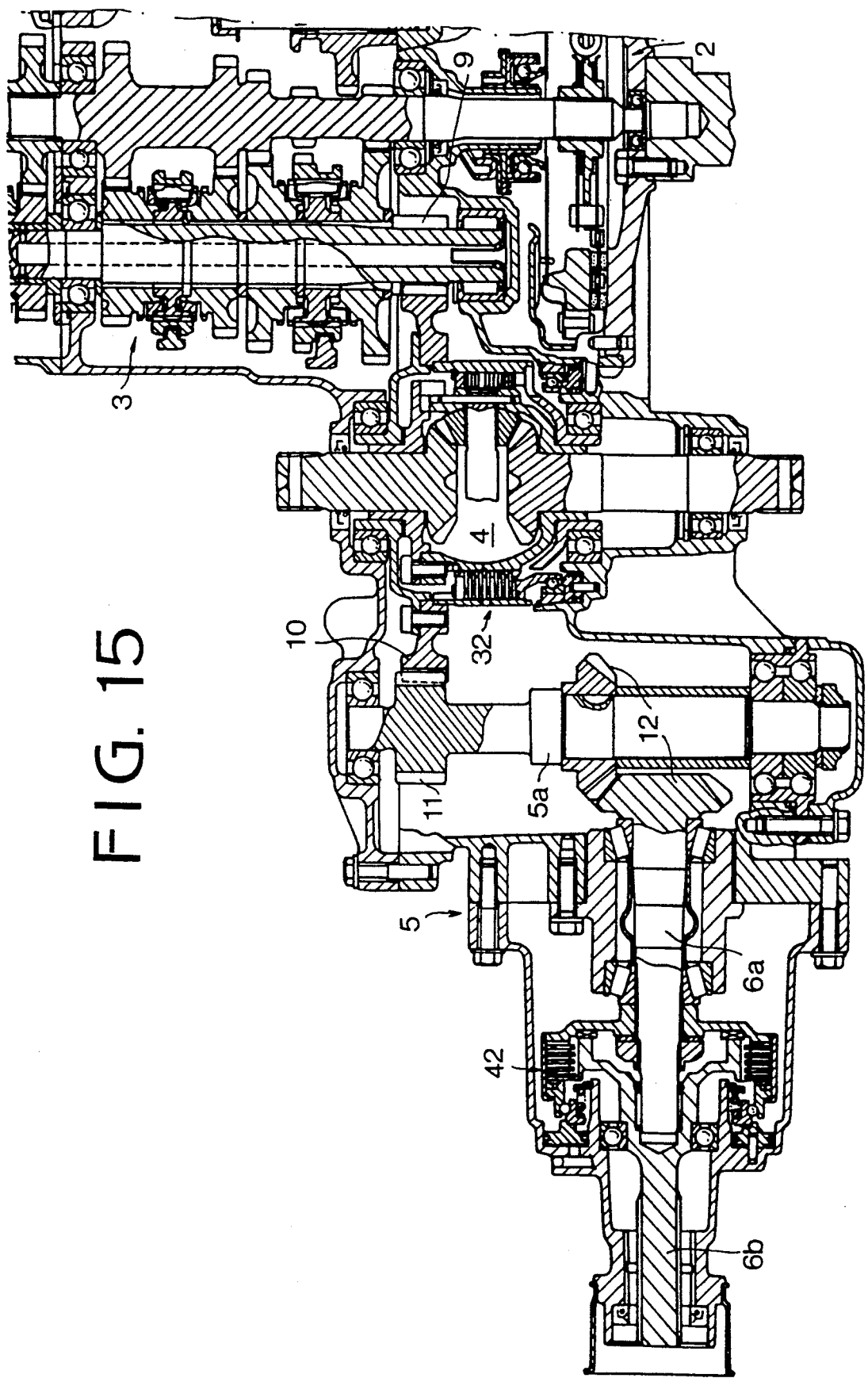

FIG. 15 shows a further modification. A second transfer clutch 42 is provided between rear drive shafts 6a and 6b connected to the propeller shaft. The construction of the transfer clutch 42 is substantially the same as the clutch 41.

Figure 16:
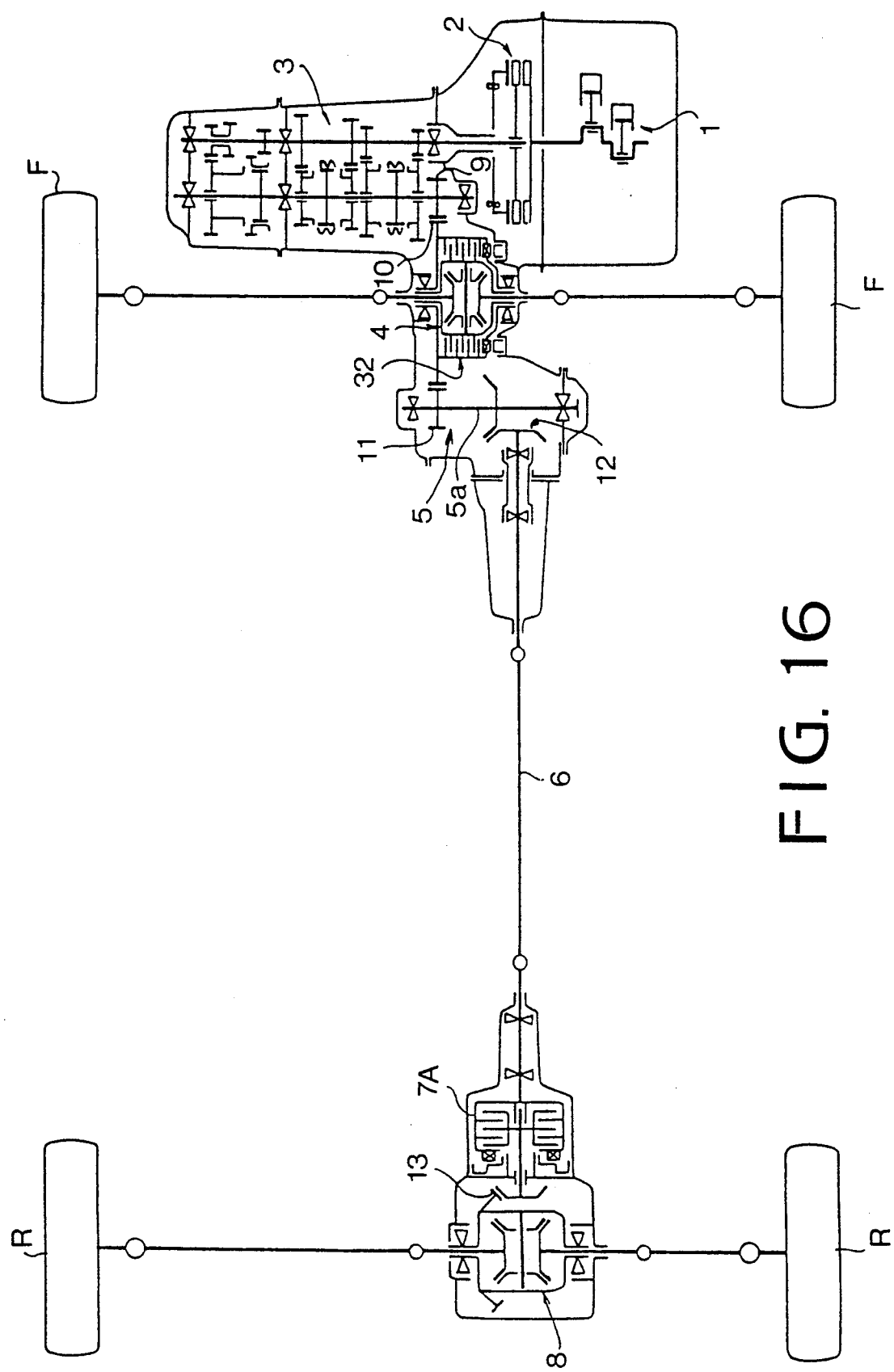
FIG. 16 is a schematic diagram showing of a fourth embodiment.

FIG. 16 shows a fourth embodiment in which the transfer clutch 32 is provided as a first transfer clutch in the same manner as described in the second embodiment of FIGS. 7 to 10 and a transfer clutch 7A is provided as a second transfer clutch in the same manner as the clutch 7 in the first embodiment of FIGS. 1 to 5.

Referring to FIG. 17, an independent hydraulic circuit is provided for the second transfer clutch 7A. The hydraulic circuit has an oil pump 14A, a regulator valve 15b, and a pilot valve 18b in addition to the valves of the circuit shown in FIG. 13.

Farther, the system is provided with an FF switch 40a for establishing a front-wheel drive system, an FR switch 40b for establishing a rear-wheel drive system, and a four-wheel control switch 40c.

When a signal from the FF switch 40a is applied to the control unit 19, the control unit 19 produces a duty ratio signal of 0% which is applied to the solenoid operated valve 17a of the first transfer clutch 32. The first transfer clutch 32 is entirely engaged and the second transfer clutch 7A is disengaged so that the engine torque is transmitted only to the front wheels F to provide the front-wheel drive system. When a signal from the FR switch 40b is applied to the control unit 19, the duty ratio signal of 0% is applied to the solenoid operated valve 17b of the second transfer clutch 7A. Thus, the first transfer clutch 32 is disengaged and the second transfer clutch 7A is engaged to transmit the torque only to the rear wheels R to provide a rear-wheel drive system.

When a signal from the 4WD control switch 40c is applied to the control unit 19, the CPU 150 calculates the duty ratios for the solenoid operated control valves 17a and 17b between 0% and 100% in accordance with a map stored in the memory 151. The solenoid operated valves 17a and 17b actuate to control the oil for the transfer control valves 16a and 16b so that the respective clutch pressures supplied to the transfer clutches 32 and 7A varies in accordance with the driving conditions of the motor vehicle. Thus, a four-wheel drive mode is provided for distributing the torque to the front wheels F and the rear wheels R.

When the vehicle turns a corner at a small radius during four-wheel driving, an inside circulating torque is produced in the power transmitting system because of the difference between cornering radii of the front wheels and the rear wheels, which causes a tight corner braking effect on the vehicle.

Figure 17A:
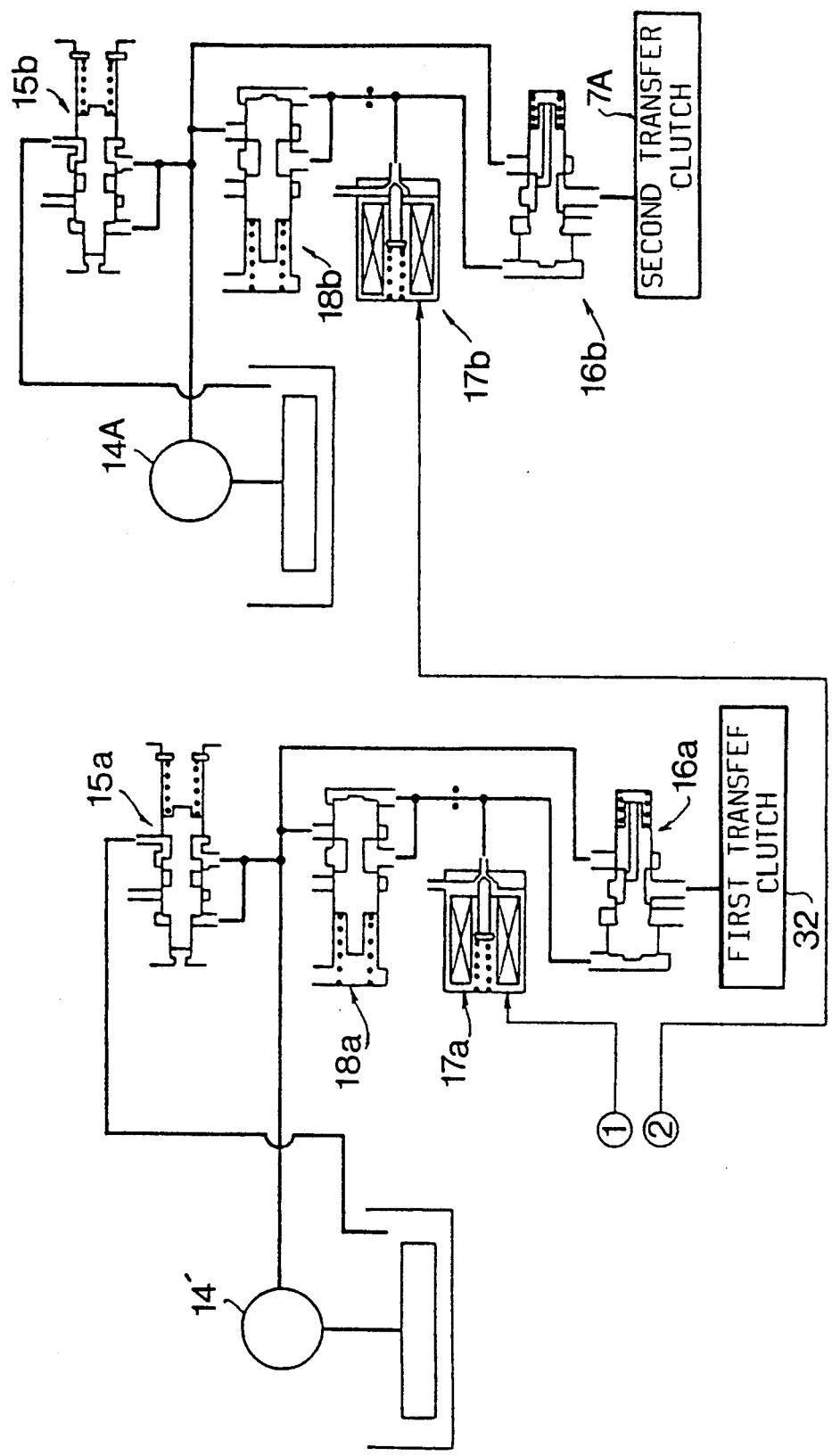
FIGS. 17a, 17b show a hydraulic control circuit of the fourth embodiment.
Figure 17B:
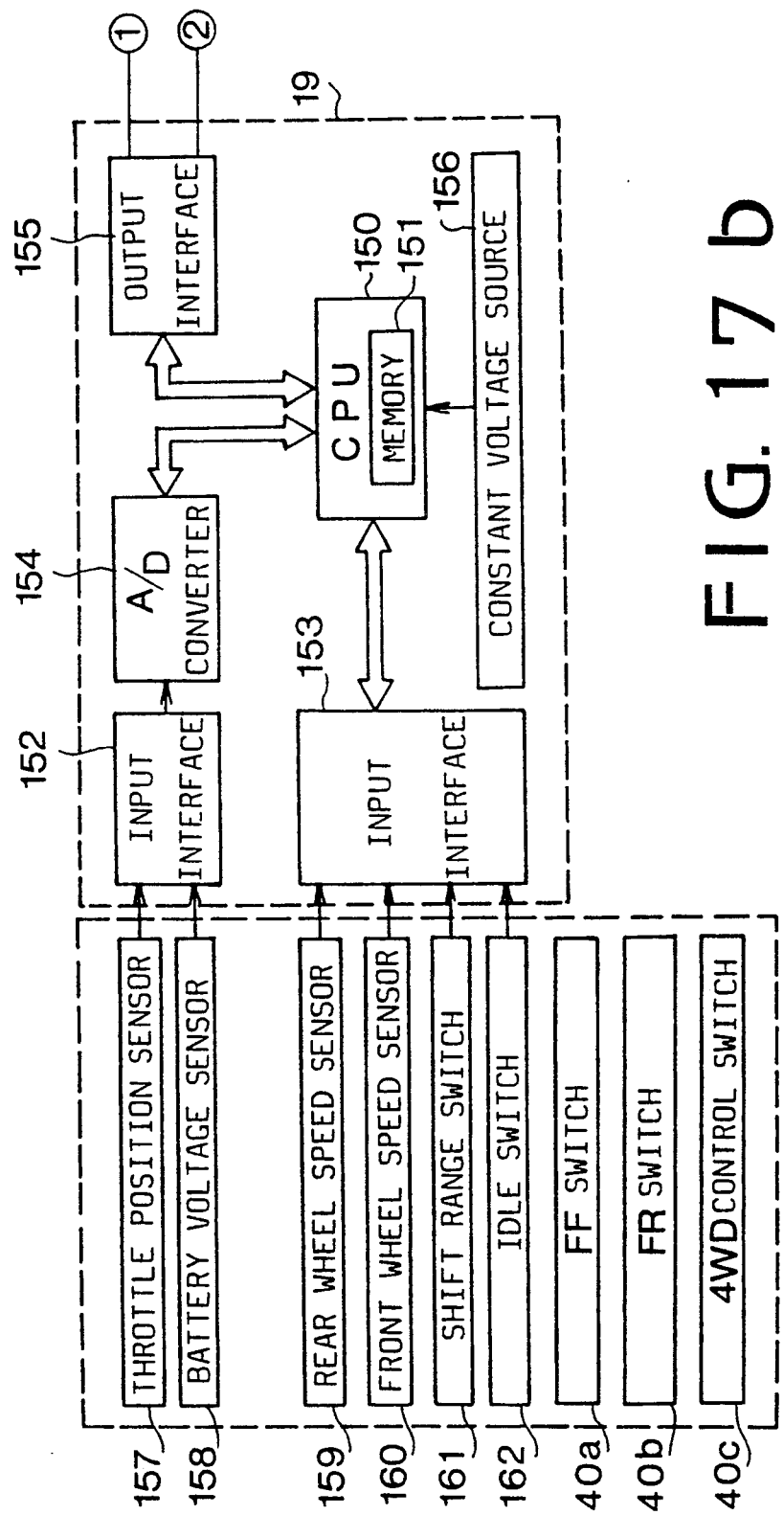

In the system of FIGS. 16 and 17a, 17b the difference between front-wheel speed and rear-wheel speed is detected by the sensors 159 and 160. In accordance with the speed difference, the clutch pressure applied to one of the first and the second transfer clutches is reduced to produce slip in the corresponding clutch, thereby preventing the tight corner braking effect.

In accordance with the fourth embodiment, since one of the transfer clutches is disposed in the front differential and the other clutch is disposed in the rear differential which is independently provided, the transfer device is compact in structure.

Further, the appropriate driving mode of the vehicle is selected in accordance with the driving conditions for ensuring stability, steerability and starting characteristic of the vehicle.

Figure 18:
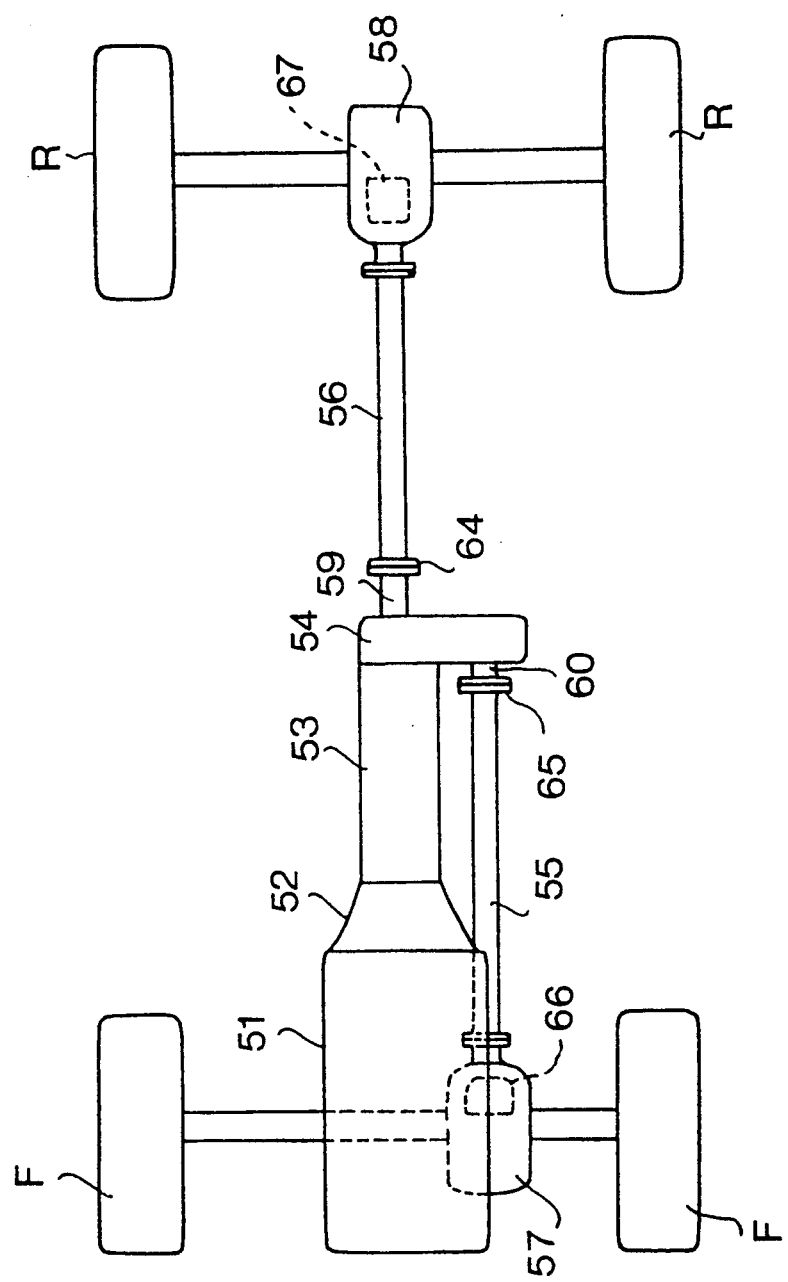
FIG. 18 is a schematic diagram showing a fifth embodiment of the present invention.
Figure 19:
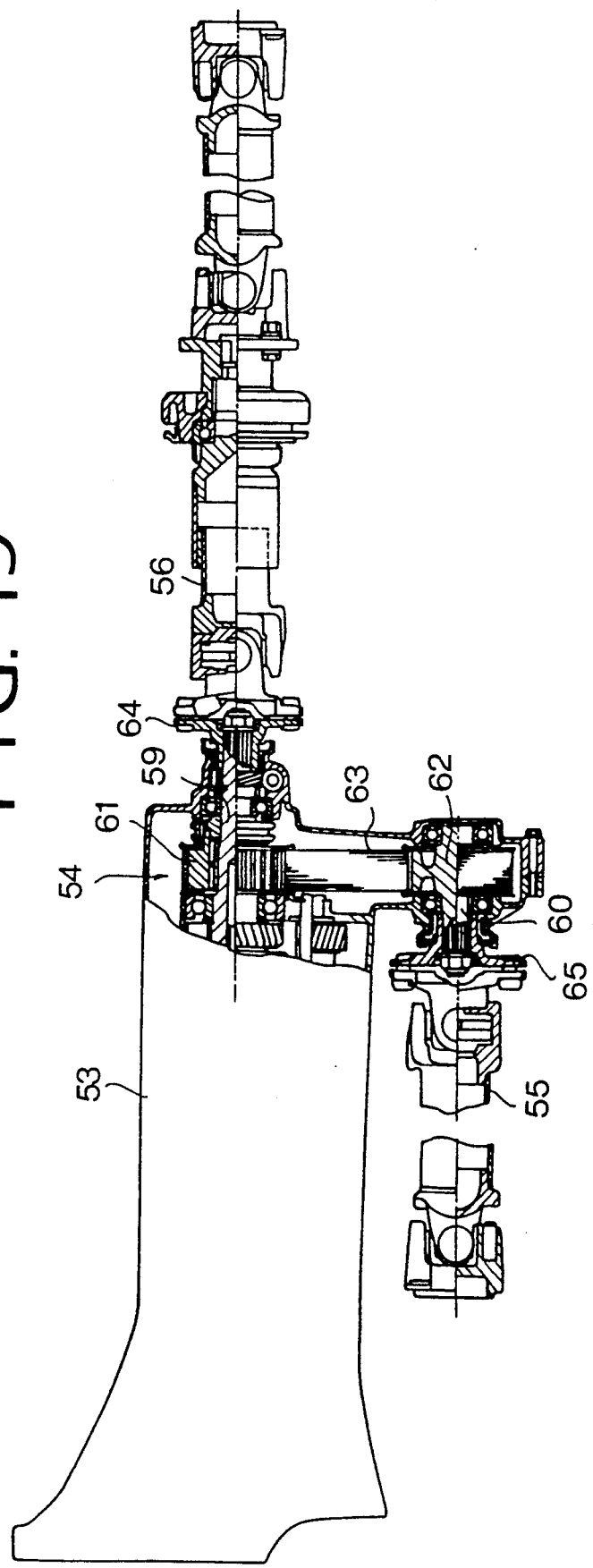
FIG. 19 is a sectional view partly showing the system of the fifth embodiment.

FIGS. 18 and 19 show a power transmission system of a fifth embodiment of the present invention. The transmission system has an engine 51 longitudinally mounted on a front portion of the vehicle, a clutch 52, a synchromesh manual transmission 53 and a transfer device 54, which are disposed in the longitudinal direction of the vehicle. A front differential 57 and a rear differential 58 are connected to the transfer device 54 by way of propeller shafts 55 and 56.

Referring to FIG. 19, the transfer device 54 comprises a transfer drive sprocket 61 splined to an output shaft 59 of the transmission 53, a transfer driven sprocket 62 splined to a front drive shaft 60, and a drive belt 63 made of a chain provided between the sprockets 61 and 62. The output shaft 59 is connected to the propeller shaft 56 through a companion flange 64 and the front drive shaft 60 is connected to the propeller shaft 55 through a companion flange 65.

A first transfer clutch 66 is provided in the front differential 57 and a second transfer clutch 67 is provided in the rear differential 58. Each of the clutches 66 and 67 has the same structure as the clutch 7 of FIG. 2 and the oil supply system is the same as the system of 17a, 17b.

Figure 20:
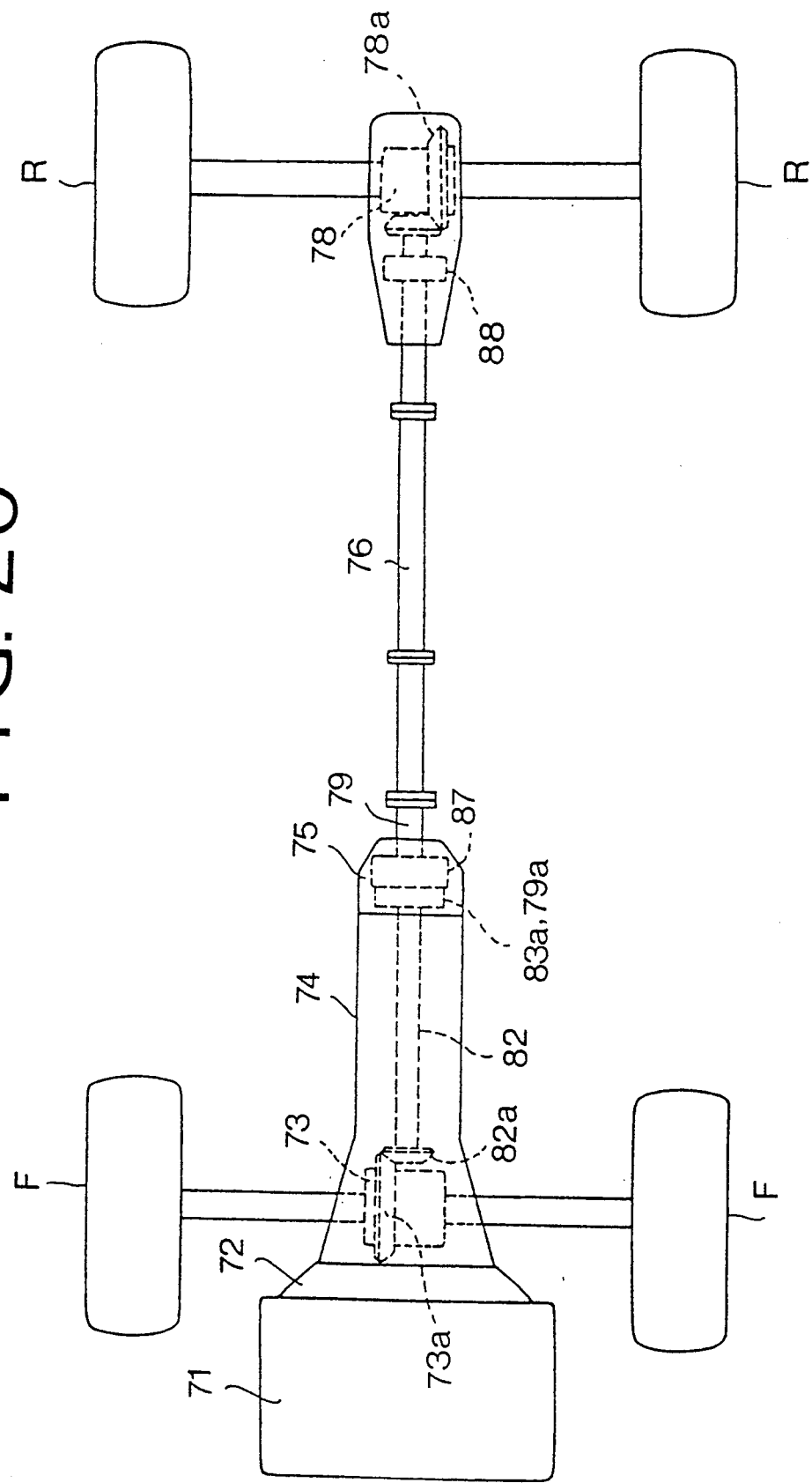
FIG. 20 is a schematic diagram showing a sixth embodiment of the present invention.
Figure 21:
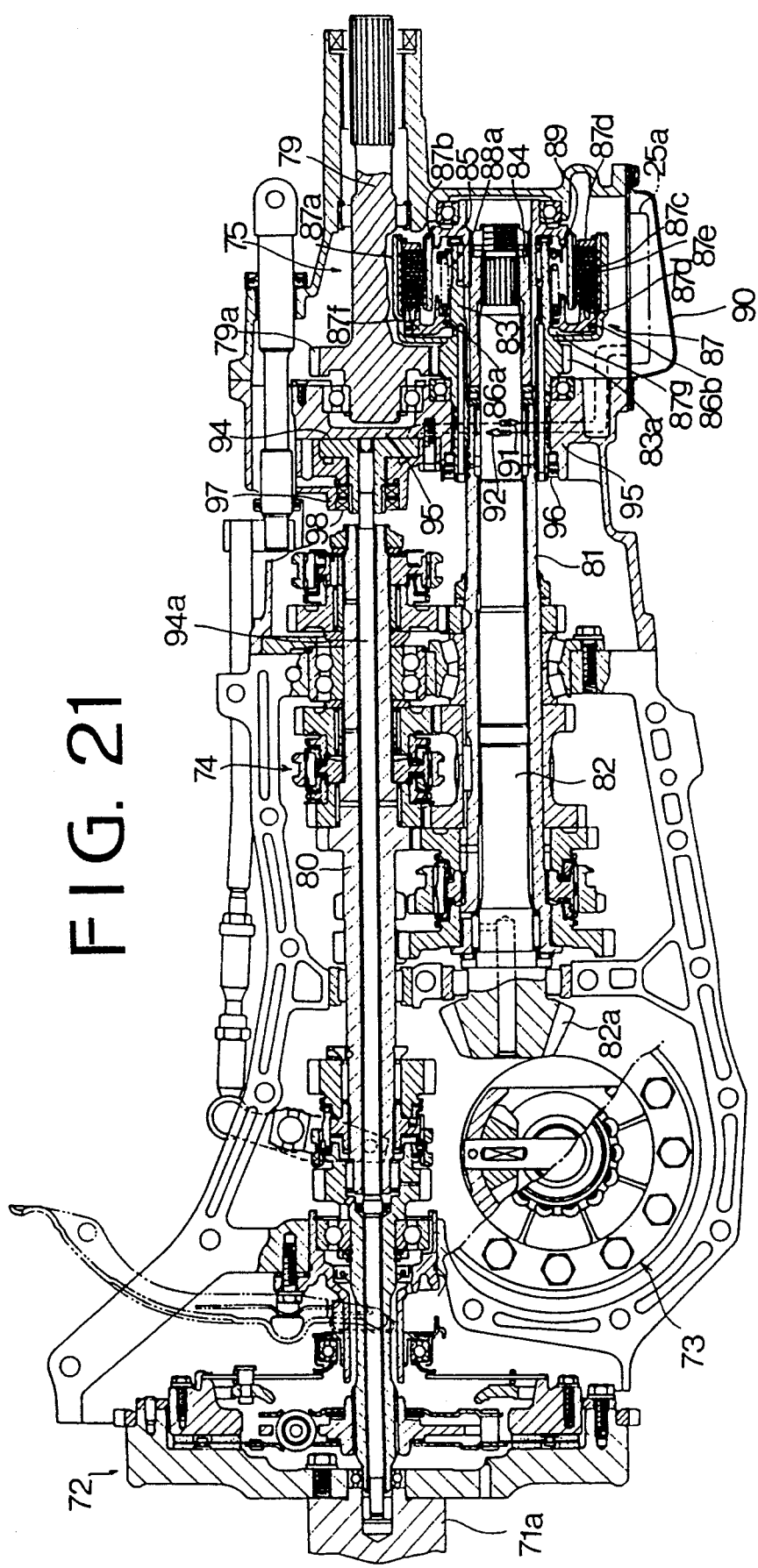
FIG. 21 is a sectional view showing a main part of the system of the sixth embodiment.

FIGS. 20 and 21 show a sixth embodiment of the present invention. The motor vehicle has an engine 71 at a front portion thereof, a clutch 72, a manual transmission 74, a transfer device 75 having a first transfer clutch 87, and a front differential 73. A rear differential 78 having a second transfer clutch 88 is connected to the transfer device 75 through a propeller shaft 76 and a rear drive shaft 79.

Referring to FIG. 21, the transmission 74 has an input shaft 80 operatively connected to a crank shaft 71a of the engine 71 and a hollow output shaft 81 disposed in parallel with the input shaft. A front drive shaft 82 is disposed in the output shaft 81. A drive pinion 82a of the front drive shaft 82 engages with a final reduction gear 73a (FIG. 20) of the front differential 73.

The power of the engine is transmitted to the output shaft 81 through the input shaft 80 of the transmission and to the front wheels F through the first transfer clutch 87, the front drive shaft 82, the drive pinion 82a, the final reduction gear 73a and the front differential 73. The output shaft 81 is operatively connected to the rear drive shaft 79 through the transfer drive gears 83a and a driven gear 79a to transmit the power of the engine to the rear wheels R through the propeller shaft 76, the second transfer clutch 88, and a final reduction gear 78a of the rear differential 78.

The transfer device 75 comprises the transfer driven gear 79a integrated with the rear drive shaft 79, a gear sleeve 83 mounted on the output shaft 81, the transfer drive gear 83a integrated with the sleeve 83 and engaged with the driven gear 79a, an intermediate shaft 84 secured to a rear portion of the front drive shaft 82, a cylindrical supporting member 85 splined to the intermediate shaft 84, and the first transfer clutch 87 disposed between the supporting member 85 and the gear sleeve 83. The transfer clutch 87 comprises a drive drum 87a secured to a boss of the drive gear 83a, a driven drum 87b splined on a flange of the supporting member 85, a plurality of disks 87c splined on the drum 87a together with retainers 87d, and a plurality of disks 87e splined on the drum 87b, alternately arranged. A ring piston 87f is slidably mounted on the gear sleeve 83 through a seal ring 86a. The piston 87f is slidably engaged with an inner periphery of the drum 87a at an outer flange having an oil seal 86b. A piston chamber 87g is formed between the piston 87f and the drum 87a. A return coil spring 88a is provided between the piston 87f and a retainer 89 secured to the sleeve 83. When the oil in the oil chamber 87g is drained, the piston 87f is pushed by the spring 88a to disengage the clutch.

An oil pump 94 for the first transfer clutch 8 is housed in a pump housing 97 disposed in a rear portion of the transmission 74. The pump 94 is operated by the engine through the crank shaft 71a and a pump drive shaft 94a. An inlet of the oil pump 94 is communicated with an oil reservoir 90 attached to the underside of the transfer device 75 through a suction passage 92 and a discharge passage 93 formed in a partition 95. A valve unit 25a is provided in the reservoir 90. Oil seals 96 and 98 are provided in the partition 95 and the pump housing 97, respectively.

The second transfer clutch 88 has the same structure as the clutch 7 of the first embodiment.

Figure 22:
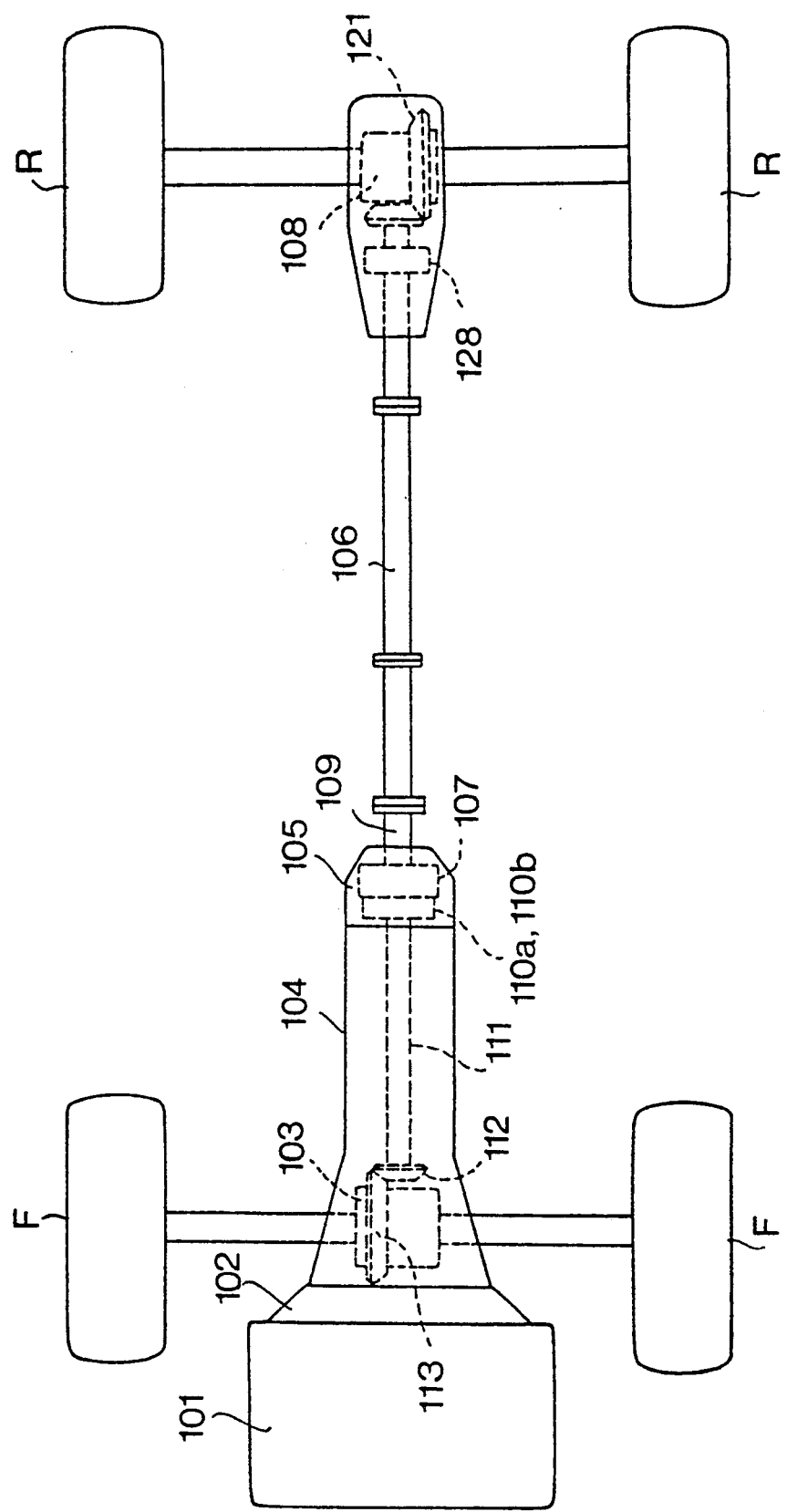
FIG. 22 is a schematic diagram showing a seventh embodiment of the invention.

FIGS. 22 and 23 show a seventh embodiment of the present invention. The power transmission system has an engine 101 at a front portion of a motor vehicle, a torque converter 102, an automatic transmission 104, a transfer device 105 and a front differential 103. A rear differential 108 is connected to the transfer device 105 through a propeller shaft 106, and an output shaft 109.

The power of the engine is transmitted to the transmission 104 through the torque converter 102. The transmission is a well-known fluid operated automatic transmission. The engine power is transmitted to the front wheels F through the output shaft 109, a first transfer clutch 107, a transfer drive gear 110a, a transfer driven gear 110b of the transfer device 105, a front drive shaft 111, a drive pinion 112, a final reduction gear 113 and the front differential 103. Further, the power from the output shaft 109 is transmitted to the rear wheels R through the propeller shaft 106, a second transfer clutch 128, a final reduction gear 121 and the rear differential 108.

Referring to FIG. 23, the first transfer clutch 107 is provided in the transfer device 105 provided on the output shaft 109. The transfer device 105 comprises the transfer drive gear 110a mounted on the output shaft 109 through a needle bearing 122, the transfer clutch 107 disposed between the drive gear 110a and a boss 109a of the output shaft 109. A boss of the drive gear 110a is supported in a transmission case 124 through a bearing 123.

The front drive shaft 111 is provided in parallel with the output shaft 109. The transfer drive gear 110a rotatably mounted on the output shaft 109 engages with the transfer driven gear 110b securely mounted on the front drive shaft 111. The drive pinion 112 of the front drive shaft 111 engages with the reduction gear 113 of the differential 103 to transmit the power of the engine to the front wheels.

The transfer clutch 107 comprises a drive drum 107a secured to the boss 109a of the output shaft 109 as a drive member, a driven drum 107b secured to the transfer drive gear 110a as a driven member, a plurality of disks 107c splined on the drum 107a through splines together with retainers 107d and a plurality of disks 107e splined on the drum 107b through splines, alternately arranged. A piston 107f is provided in the drum 107a and slidably mounted on the boss 109a of the shaft 109. The piston 107f is slidably engaged with an inner periphery of the drum 107a at an outer flange having an oil seal 125b. The piston 107f is adapted to engage with the retainers 107d. A piston chamber 107g is formed between the piston 107f and the drum 107a. The chamber 107g is communicated with the transfer control valve 16a through an oil passage 109b formed in the shaft 109.

A retainer 126 is mounted on the boss 109a of the output shaft 109 and secured by a snap ring 138 and slidably engaged with an inner periphery of the flange of the piston 107f. The retainer 126 has seal rings 139 integrally formed at an outer periphery. Thus, the retainer 126 is watertightly mounted between the output shaft 109 and the piston 107f, thereby defining a centrifugal oil pressure chamber 142 having a large volume, opposite to the oil chamber 107g. A return coil spring 127 is provided in the chamber 142 between the piston 107f and the retainer 126.

A check valve 140 is provided in the boss 109a, for communicating the chamber 142 with an oil passage 141 formed in the shaft 109.

The structure of the second transfer clutch 128 is the same as the clutch 7 of FIG. 2.

The hydraulic control system for the first and second transfer clutches 107 and 128 is similar to the system of FIG. 17. However, as shown in FIG. 24, the oil pump 114 for the first transfer clutch 107 is further communicated with an oil pressure control device 115 for controlling the automatic transmission 104.

In accordance with the seventh embodiment, when the centrifugal force of the oil generated in the piston chamber 107g, the piston 107f urges the retainer 107d. However, the centrifugal force of the oil in the chamber 142 is exerted on the piston 107f. Thus, the oil pressure exerted on the piston 107f by the centrifugal force in the piston chamber 107g is cancelled, thereby ensuring the control of the clutch torque.

While the presently preferred embodiments of the present invention have been shown and described, it is to be understood that these disclosures are for the purpose of illustration and that various changes and modifications may be made with departing from the scope of the invention as set forth in the appended claims.

What is claimed is:

1. In a power transmission system of a four-wheel drive motor vehicle having a differential, lubricated by lubricating oil, for differentiating speed of each wheel, an engine having output torque transmitted through a transmission to a set of front wheels or a set of rear wheels of the vehicle, and a fluid-operated clutch for distributing the output torque to the set of front wheels or the set of rear wheels of the vehicle through a corresponding front power train or rear power train, the improvement of the system which comprises:

- a casing adjacent the differential, provided in the corresponding one of the power trains, supported on a body of the motor vehicle and having an oil chamber therein for storing actuating oil to actuate said clutch;
- a seal member for sealing the oil chamber so as to separate said actuating oil from the lubricating oil;
- a piston non-rotatably and slidably mounted in said casing in a non-rotatable piston chamber in said oil chamber and operated by said actuating oil supplied to the piston chamber for engaging the clutch so as to distribute said output torque to said front and rear wheels in dependency on driving conditions;
- a hydraulic circuit having an oil pump for supplying the actuating oil to the non-rotatable piston chamber and valves for controlling the flow of the actuating oil in dependency on the driving conditions, whereby said non-rotatable piston and non-rotatable piston chamber prevent generation of centrifugal force of the actuating oil in the piston chamber whereby said actuating oil supplied to the piston chamber is accurately controllable, and unnecessary pressure is not exerted on members of the clutch;
- the fluid-operated clutch is a fluid-operated multiple-disk friction clutch;
- the casing is secured to a case of the transmission;
- said clutch is coaxial to axles of the set of wheels of the vehicle adjacent to said case of the transmission; and
- said clutch has a plurality of inner disks on an inner driven drum and a plurality of outer discs on an outer drive drum, said inner and outer discs are alternately disposed between one another, and said inner drum constitutes a differential case as an input member of the differential, said differential being operatively connected to said set of wheels adjacent to said transmission case, and said differential case is coaxial to said axles of said set of wheels.

2. In a power transmission system of a four-wheel drive motor vehicle having a differential lubricated by lubricating oil for differentiating speed of each wheel, an engine having output torque transmitted through a transmission to at least one of a set of front wheels and a set of rear wheels of the vehicle, a transmission case mounted on the vehicle for containing a plurality of gears of the transmission, said differential being operatively connected to the set of wheels adjacent to said transmission cse, and a fluid-operated clutch for distributing the output torque to at least one of the set of front wheels and the set of rear wheels through a corresponding power train, the improvement of the system which comprises:

- a differential case arranged axially to axles of said set of wheels;
- an inner drum provided in said clutch and constitutes said differential case as an input member of the differential;
- an outer drive drum provided in said clutch and arranged coaxially with said inner drum;
- said clutch has a plurality of inner disks mounted on said inner driven drum;
- said clutch has a plurality of outer disks mounted on an inner periphery of said outer drive drum and alternately disposed between said plurality of inner disks;
- a casing adjacent said differential securely connected to the transmission case, provided in the corresponding one of the power trains, supported on a body of the motor vehicle and having an oil chamber therein for storing actuating oil to actuate said clutch;
- a seal member for sealing the oil chamber so as to separate said actuating oil from the lubricating oil;
- a piston non-rotatably and slidably mounted in said casing in a non-rotatable piston chamber in said oil chamber and a operated by asid actuating oil supplied to the piston chamber for engaging the clutch so as to distribute said output torque to asid front and rear wheels in dependency on driving conditions; and
- a hydraulic circuit having an oil pump for supplying the actuating oil to the non-rotatable piston chamber and valves for controlling the flow of the actuating oil in dependency on the driving conditions, whereby said non-rotatable piston and non-rotatable piston chamber prevent generation of centrifugal force of the actuating oil in the piston chamber whereby said actuating oil supplied to the piston chamber is accurately controllable, and unnecessary pressure is not exerted on members of the clutch.

* * * * *